US009092142B2

(12) United States Patent
Nashimoto et al.

(10) Patent No.: US 9,092,142 B2
(45) Date of Patent: Jul. 28, 2015

(54) STORAGE SYSTEM AND METHOD OF CONTROLLING THE SAME

(75) Inventors: Kunihiko Nashimoto, Ninomiya (JP); Keishi Tamura, Fujisawa (JP); Hideo Saito, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 13/521,656

(22) PCT Filed: Jun. 26, 2012

(86) PCT No.: PCT/JP2012/004137

§ 371 (c)(1), (2), (4) Date: Jul. 11, 2012

(87) PCT Pub. No.: WO2014/002136

PCT Pub. Date: Jan. 3, 2014

(65) Prior Publication Data

US 2013/0346708 A1 Dec. 26, 2013

(51) Int. Cl.

| | |
|---|---|
| ***G06F 9/312*** | (2006.01) |
| ***G06F 13/14*** | (2006.01) |
| ***G06F 3/06*** | (2006.01) |

(52) U.S. Cl.

CPC ................ *G06F 3/061* (2013.01); *G06F 3/065* (2013.01); *G06F 3/067* (2013.01); *G06F 3/0659* (2013.01)

(58) Field of Classification Search

CPC ... G06F 3/0685; G06F 3/0647; G06F 3/0665; G06F 3/067; G06F 3/0631; G06F 11/3433; G06F 11/3485; G06F 12/1475; G06F 2212/7204; G06F 11/0745; G06F 3/065; G06F 2206/1012; G06F 11/0709; G06F 11/0727; G06F 11/0757; G06F 11/30; G06F 12/00; G06F 2003/0697; G06F 2201/81; G06F 3/0689; G06F 3/061; G06F 3/0641; G06F 11/2056; G06F 2003/0698; G06F 2212/286

See application file for complete search history.

(56) References Cited

U.S. PATENT DOCUMENTS

2004/0148482 A1* 7/2004 Grundy et al. ................ 711/167
2010/0082897 A1* 4/2010 Amano et al. ................ 711/112

(Continued)

FOREIGN PATENT DOCUMENTS

JP 2009-266120 A 11/2009

OTHER PUBLICATIONS

PCT International Search Report and Written Opinion on application PCT/JP2012/004137 mailed Jan. 10, 2013; 12 pages.

(Continued)

*Primary Examiner* — Cheng-Yuan Tseng
*Assistant Examiner* — Candice Rankin
(74) *Attorney, Agent, or Firm* — Foley & Lardner LLP

(57) ABSTRACT

For first write request to a virtual volume, the first storage apparatus performs processing by a method of either a first write processing method that stores write data in a first logical volume associated with the virtual volume as well as transfers a first write request, to the second storage apparatus, for storing the write data in a second logical volume associated with the virtual volume of the second storage apparatus or a second write processing method that transfers a first write request, to the second storage apparatus, then selects a processing method according to a first IO load on a first area of the virtual volume of the first storage apparatus and a second IO load on the first area of the virtual volume of the second storage apparatus to perform a processing for the first write request.

16 Claims, 22 Drawing Sheets

(56) References Cited

U.S. PATENT DOCUMENTS

| | | | | |
|---|---|---|---|---|
| 2012/0023305 | A1* | 1/2012 | Satoyama et al. | 711/170 |
| 2012/0060051 | A1 | 3/2012 | Ninose | |
| 2012/0278566 | A1* | 11/2012 | Gilson | 711/159 |

OTHER PUBLICATIONS

Troppens, Ulf, et al.; Storage Networks Explained: Basics and Application of Fibre Channel SAN, NAS, iSCSI, Infiniband and FCoE—Intelligent Disk Subsystems; 2009; John Wiley & Sons, Ltd.; pp. 15-39.

* cited by examiner

LDEV MANAGEMENT TABLE 121
(FIRST STORAGE APPARATUS)

| RAID GROUP ID (311) | LDEV−ID (312) |
|---|---|
| 1(Drive00,01,02,03) | 00:00 |
| | 00:01 |
| | 00:02 |
| 2(Drive04,05,06,07) | 00:03 |
| | 00:04 |
| : | : |

FIG. 3

LDEV MANAGEMENT TABLE 121
(SECOND STORAGE APPARATUS)

| RAID GROUP ID (311) | LDEV−ID (312) |
|---|---|
| 1(Drive00,01,02,03) | 10:00 |
| | 10:11 |
| | 10:12 |
| 2(Drive04,05,06,07) | 10:13 |
| | 10:14 |
| : | : |

FIG. 4

VIRTUAL LDEV MANAGEMENT TABLE 122
(FIRST STORAGE APPARATUS)

| VIRTUAL LDEV (411, 412) | | STORAGE SYSTEM 1 (413, 414) | | STORAGE SYSTEM 2 (415, 416) | | PATH INFORMATION (417) |
|---|---|---|---|---|---|---|
| VIRTUAL PRODUCTION NUMBER | VIRTUAL LDEV | FIRST LDEV | FIRST ATTRIBUTE | SECOND LDEV | SECOND ATTRIBUTE | |
| F0:00 | 11111 | 00:00 | Master | 10:10 | Slave | I1-T1 |
| F0:01 | 22222 | 00:01 | Slave | 10:11 | Master | I3-T3 |
| : | : | : | : | : | : | : |

FIG. 5

VIRTUAL LDEV MANAGEMENT TABLE 122
(SECOND STORAGE APPARATUS)

| VIRTUAL LDEV (411, 412) | | STORAGE SYSTEM 1 (413, 414) | | STORAGE SYSTEM 2 (415, 416) | | PATH INFORMATION (417) |
|---|---|---|---|---|---|---|
| VIRTUAL PRODUCTION NUMBER | VIRTUAL LDEV | FIRST LDEV | FIRST ATTRIBUTE | SECOND LDEV | SECOND ATTRIBUTE | |
| F0:00 | 11111 | 00:00 | Master | 10:10 | Slave | I1-T1 |
| F0:01 | 22222 | 00:01 | Slave | 10:11 | Master | I3-T3 |
| : | : | : | : | : | : | : |

FIG. 6

OPERATION MODE MANAGEMENT TABLE 123
(FIRST STORAGE APPARATUS)

| VIRTUAL LDEV (511) | PAGE (512) | OPERATION MODE (513) | OPERATION MODE CHANGE PERMISSION (514) |
|---|---|---|---|
| 00:00 | 1(0x0000 ~0x1000) | HA MODE | Y |
| | 2(0x1000 ~0x2000) | HA MODE | Y |
| | ~ | | |
| : | | | |
| FF:FF | | | |

FIG. 7

OPERATION MODE MANAGEMENT TABLE 123
(SECOND STORAGE APPARATUS)

| VIRTUAL LDEV (511) | PAGE (512) | OPERATION MODE (513) | OPERATION MODE CHANGE PERMISSION (514) |
|---|---|---|---|
| 00:00 | 1(0x0000 ~0x1000) | HA MODE | Y |
| | 2(0x1000 ~0x2000) | HA MODE | Y |
| | ~ | | |
| : | | | |
| FF:FF | | | |

FIG. 8

I/O LOAD MANAGEMENT TABLE 124
(FIRST STORAGE APPARATUS)

| LDEV (611) | PAGE(ADDRESS) (612) | ACCESS COUNT (TOTAL) (IOPS) (613) | ACCESS COUNT (Read) (IOPS) (614) | ACCESS COUNT (Write) (IOPS) (615) | OPERATION MODE CHANGE UPPER THRESHOLD (IOPS) (616) | OPERATION MODE CHANGE LOWER THRESHOLD (IOPS) (617) | OPERATION MODE CHANGE UPPER THRESHOLD (Read) (IOPS) (618) |
|---|---|---|---|---|---|---|---|
| 00:00 | 1(0x0000 ~0x1000) | 2. 0M | 1. 5M | 0. 5M | 1. 0M | 100 | 0. 5M |
| | 2(0x1000 ~0x2000) | 0. 5M | 0. 2M | 0. 3M | 1. 0M | 100 | 0. 5M |
| | : | : | : | : | : | : | : |
| | : | : | : | : | : | : | : |

FIG. 9

I/O LOAD MANAGEMENT TABLE 124
(SECOND STORAGE APPARATUS)

| LDEV (611) | PAGE(ADDRESS) (612) | ACCESS COUNT (TOTAL) (IOPS) (613) | ACCESS COUNT (Read) (IOPS) (614) | ACCESS COUNT (Write) (IOPS) (615) | OPERATION MODE CHANGE UPPER THRESHOLD (IOPS) (616) | OPERATION MODE CHANGE LOWER THRESHOLD (IOPS) (617) | OPERATION MODE CHANGE UPPER THRESHOLD (Read) (IOPS) (618) |
|---|---|---|---|---|---|---|---|
| 00:00 | 1(0x0000 ~0x1000) | 0. 1M | 0. 1M | 0. 0M | 1. 0M | 100 | 0. 5M |
| | 2(0x1000 ~0x2000) | 2. 0M | 1. 2M | 1. 3M | 1. 0M | 100 | 0. 5M |
| | : | : | : | : | : | : | : |
| | : | : | : | : | : | : | : |

FIG. 10

DUAL MANAGEMENT METHOD (WRITE REQUEST)

I/O REQUEST TRANSFER METHOD

STORAGE SYSTEM AND METHOD OF CONTROLLING THE SAME

TECHNICAL FIELD

The present invention relates to a storage system and a method of controlling the storage system.

BACKGROUND ART

PTL 1 discloses an information system including a virtual storage apparatus 1000L and a virtual storage apparatus 1000R. The virtual storage apparatus 1000L provides a volume 3000LA to which the storage areas of its own HDDs 1030 are allocated, while the virtual storage apparatus 1000R provides a volume 3000RA to which the storage areas of HDDs 1030 in the virtual storage device itself are allocated. A same identifier is assigned to the volume 3000LA and the volume 3000RA. When receiving a write request for the volume 3000LA from a host, the virtual storage apparatus 1000L returns a response indicating that IO has succeeded to the host after confirming that both writing to the volume 3000LA and writing to the volume 3000RA of the virtual storage apparatus 1000R have been completed.

CITATION LIST

Patent Literature

PTL 1: JP-A 2009-266120

SUMMARY OF INVENTION

Technical Problem

Here, there is a configuration in which a storage apparatus A provides computers with a virtual volume A corresponding to a physical volume A and a storage apparatus B provides the computers with a virtual volume B corresponding to a physical volume B and having the same identifier as that of the virtual volume A. In a case where the storage apparatus A receives a write request for the virtual volume A from the computer in the above configuration, it is necessary to issue to the computer a completion report for the write request after storing data in both of the physical volume A and the physical volume B of the storage apparatus B in order to allow the plurality of computers to access any of the storage apparatuses.

However, in this case, if a high IO load is applied to only one of the storage apparatus A and the storage apparatus B, the storage apparatus with the high IO load has to transmit write data to the other storage apparatus every time a write request is received, which in turn poses a problem of how to secure IO performance for the computers. Further, when the IO load is biased to either one of the storage apparatuses, the other storage apparatus receives a small amount of read requests so that even if the other storage apparatus were to have retained real data, response performance to the read request cannot be improved compared to the case where the other storage apparatus does not retain real data.

The present invention has been made in view of the above-described background and the main objective of the present invention is to provide a storage system and a method of controlling the storage system which are capable of providing an environment for the usage of a virtual volume while securing IO performance and the like.

Solution to Problem

One aspect of the present invention to achieve the objective is a storage system which includes a first storage apparatus including a first logical volume associated with a virtual volume, and providing the virtual volume, and a second storage apparatus being coupled to the first storage apparatus, having a second logical volume associated with the virtual volume, and providing the virtual volume, wherein the first storage apparatus when receiving a first write request for the virtual volume, is capable of performing a processing for the first write request by one of a first write processing method by which a processing of storing write data relating to the first write request in the first logical volume is executed as well as the first write request is transferred to the second storage apparatus to store the write data in the second logical volume in the second storage apparatus, and a second write processing method by which the first write request is transferred to the second storage apparatus to store the write data in the second logical volume in the second storage apparatus without executing the processing of storing the write data in the first logical volume, and the first storage apparatus performs a processing for the first write request by selecting either the first write processing method or the second write processing method according to a first IO load for a predetermined area of the virtual volume in the first storage apparatus, and a second IO load for the predetermined area of the virtual volume in the second storage apparatus.

Other problems and solutions to the problems which are disclosed in the present application will become apparent from the description of embodiments and the drawings.

Advantageous Effects of Invention

According to the present invention, there can be provided an environment for the usage of a virtual volume while securing IO performance and the like.

BRIEF DESCRIPTION OF DRAWINGS

FIG. 3 is an example of an LDEV management table 121 which is stored in a first storage apparatus 10.

FIG. 4 is an example of the LDEV management table 121 which is stored in a second storage apparatus 10.

FIG. 5 is an example of a virtual LDEV management table 122 which is stored in the first storage apparatus 10.

FIG. 6 is an example of a virtual LDEV management table 122 which is stored in the second storage apparatus 10.

FIG. 7 is an example of an operation mode management table 123 which is stored in the first storage apparatus 10.

FIG. 8 is an example of the operation mode management table 123 which is stored in the second storage apparatus 10.

FIG. 9 is an example of an IO load management table 124 which is stored in the first storage apparatus 10.

FIG. 10 is an example of the IO load management table 124 which is stored in the second storage apparatus 10.

DESCRIPTION OF EMBODIMENTS

Figure 1:
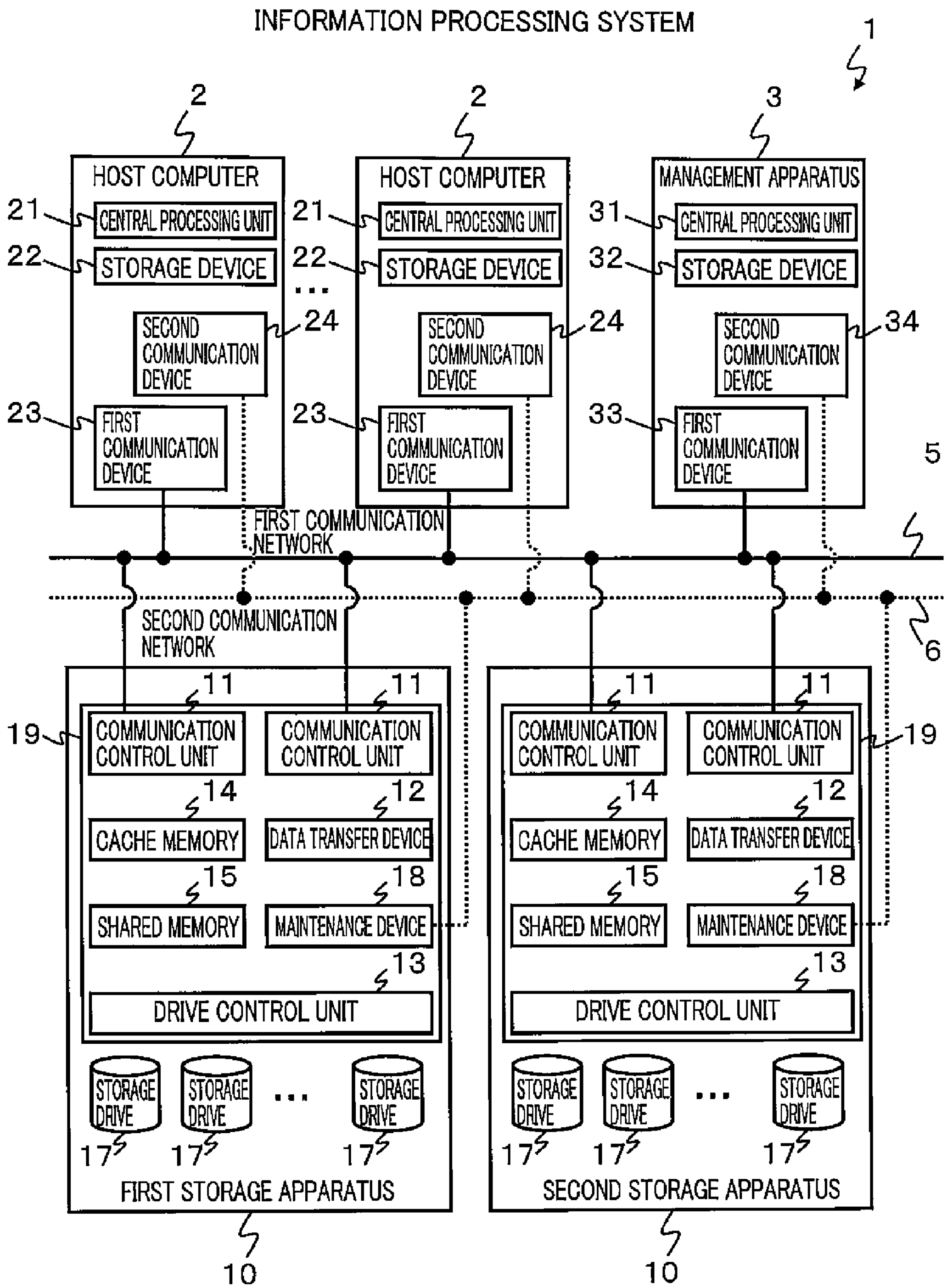
FIG. 1 is a drawing illustrating a schematic configuration of an information processing system 1.

FIG. 1 shows a schematic configuration of an information processing system 1 which is described as an embodiment. As shown in FIG. 1, the information processing system 1 includes a storage system which is configured of two storage apparatuses 10 (a first storage apparatus 10, a second storage apparatus 10), at least one host computer 2 which accesses to the first storage apparatus 10 and the second storage apparatus 10, a management apparatus 3 which monitors, controls, sets and the like each component in the information processing system 1, a first communication network 5, and a second communication network 6. In the following description, when matters common to the first storage apparatus 10 and the second storage apparatus 10 are described, they may be collectively referred to as the "storage apparatus 10".

The host computer 2 is, for example, an information processing apparatus which is used for providing bank's automated teller services, Internet web page browsing services and the like, and is configured of hardware such as a personal computer, an office computer, a mainframe and the like.

The first communication network 5 is used for transmitting an IO request which is issued from the host computer 2 to the storage apparatus 10, and responding to the IO request from the storage apparatus 10 to the host computer 2. The IO request is a data write request (hereinafter, referred to as a wire request), a data read request (hereinafter, referred to as a read request), or the like.

The first communication network 5 is, for example, SAN (Storage Area Network), LAN (Local Area Network), WAN (Wide Area Network), the Internet or the like, and is configured with a network switch such as a switching hub, a router or the like. Communications via the first communication network 5 are performed using a communication protocol such as TCP/IP, FCoE (Fibre Channel over Ethernet), iSCSI (Internet Small Computer System Interface) and the like.

The host computer 2 includes a central processing unit 21, a storage device 22, a first communication device 23, and a second communication device 24. The central processing unit 21 is configured with, for example, a CPU or MPU. The storage device 22 is a volatile or non-volatile memory (RAM, ROM, NVRAM (Non Volatile RAM)), a hard disk drive, SSD (Solid State Drive), or the like. The first communication device 23 is, for example, an HBA, and communicates with other devices via the first communication network 5. The second communication device 24 is, for example, a NIC, and communicates with other devices via the second communication network 6. The host computer 2 may include an input device (such as a keyboard, a mouse, and a touch panel) and an output device (such as a liquid crystal monitor and a printer).

The management apparatus 3 provides the administrator and the like of the information processing system 1 with a user interface (such as GUI (Graphical User Interface) and CLI (Command Line Interface)) which is used for monitoring, controlling, and setting the information processing system 1.

The management apparatus 3 performs transmits information (such as collects information for monitoring, sends a control command, and sends/receives setting information) as needed between the host computer 2 and the storage apparatus 10 via the second communication network 6.

The second communication network 6 is, for example, LAN, WAN, the Internet, a public telecommunication network, a lease line, or the like, and is configured with a network switch such as a switching hub or a router. Communications via the second communication network 6 are performed using a communication protocol such as TCP/IP.

The management apparatus 3 includes a central processing unit 31, a storage device 32, a first communication device 33, and a second communication device 34. The central processing unit 31 is configured with, for example, a CPU and an MPU. The storage device 32 is a volatile or a non-volatile memory 22 (RAM, ROM, NVRAM), a hard disk drive, SSD, or the like. The first communication device 33 is, for example, an HBA, and communicates with other devices via the first communication network 5. The second communication device 34 is, for example, a NIC and communicates with other devices via the second communication network 6.

The storage apparatus 10 is a disk array apparatus for providing the host computer 2 with a data storage area. The storage apparatus 10 includes at least one communication control unit 11, a data transfer device 12, at least one drive control unit 13, a cache memory 14, a shared memory 15, a storage drive 17, a maintenance device 18 (also referred to as SVP (Service Processor)), and a storage controller 19. The storage controller 19 (also simply called controller) includes at least one communication control unit 11, a data transfer device 12, at least one drive control unit 13, a cache memory 14, a shared memory 15, and a maintenance device 18.

The communication control unit 11 (also referred to as a channel control unit), the drive control unit 13, the cache memory 14, and the shared memory 15 are communicatively coupled with one another via communication means such as a crossbar switch, PCI bus (PCI: Peripheral Component Interconnect), or PCI-Express bus. The storage drive 17 may be accommodated in a chassis different from the other components configuring the storage apparatus 10.

The communication control unit 11 communicates with other devices (including other storage apparatuses 10) via the first communication network 6. The communication control unit 11 includes a central processing unit (such as a CPU, an MPU), a storage device (such as a semiconductor memory), and a communication device (such as an HBA (Host Bus Adaptor), a NIC (Network Interface card)). The communication control unit 11, for example, communicates with other devices which is performed according to the communication protocol or performs processing relating to the IO request received from the host computer 2.

The drive control unit 13 communicates with the storage drive 17, and writes data into the storage drive 17 or reads the data from the storage drive 17. The drive control unit 13 includes a central processing unit (such as a CPU, MPU), a storage device (such as a semiconductor memory), and a communication device (such as HBA, NIC, or SCSI interface).

The data transfer device 12 mediates data transfer which is performed among the communication control unit 11, the drive control unit 13, and the cache memory 14. The data transfer device 12 includes a device capable of high-speed data transfer (such as DMA (Direct Memory Access), a central processing unit (CPU, MPU)), and a storage device (such as a semiconductor memory). For example, the data transfer device 12 performs data transfer (data read from the storage drive 17, data to be written into the storage drive 17) between the communication control unit 11 and the drive control unit 13 via the cache memory 14, reads the data from the storage drive 17, the data being stored in the cache memory 14, or writes the data in the storage drive 17.

The cache memory 14 temporarily stores, for example, data to be written in the storage drive 17 or data which is read from the storage drive 17 to be transmitted to the host computer 2. The cache memory 14 is configured with, for example, a RAM capable of writing/reading data at a high speed.

The shared memory 15 stores programs and data which are utilized by, for example, the communication control unit 11, the data transfer device 12, or the drive control unit 13. The shared memory 15 is configured using, for example, a RAM, a ROM, or an NVRAM.

The maintenance device 18 monitors, controls, and sets each component included in the storage apparatus 10. The maintenance device 18 is an information processing apparatus (for example, a personal computer) including a central processing unit, a memory, an auxiliary storage device, an input device, a display device, a communication circuit and the like.

The maintenance device 18 acquires information (such as configuration information, various pieces of setting information, operation information) from the storage apparatus 10 by communicating with the components included in the storage apparatus 10 via communication means such as a LAN. Also, the maintenance device 18 communicates with the management apparatus 3 via the second communication network 6 and transmits information between the management apparatus 3.

The storage driver 17 is, for example, a hard disk drive (such as SAS (Serial Attached SCSI), SATA (Serial ATA), FC (Fibre Channel), PATA (Parallel ATA), or SCSI (Small Computer System Interface)) or a semiconductor storage device (SDD).

The storage apparatus 10 configures a logical storage area (hereinafter referred to as LEDV (Logical Device)) which is provided by controlling the storage drive 17 with a RAID (Redundant Array of Inexpensive (or Independent) Disks) method (for example, RAID0 to 6). This logical storage area is implemented using a storage area of, for example, a RAID group (also referred to as a parity group).

A unique identifier (LDEV-ID) is assigned to LEDV. The host computer 2 transmits to the storage apparatus 10 an IO request in which an LDEV-ID is designated, and then the storage apparatus 10 performs processing for the IO request by targeting the LEDV-ID (or the LDEV-ID corresponding to the identifier relating to the data storage area specified in the IO request)designated in the IO request.

The storage apparatus 10 configures a virtual storage area (hereinafter referred to as a virtual LDEV) associated with the configured LDEV and provides the host computer 2 with the configured virtual LDEV. Similar to the case where the host computer 2 accesses the storage apparatus 10 by targeting the LDEV, the host computer 2 can transmit to the storage apparatus 10 an IO request in which a unique identifier is given to each of the virtual LDEVs (hereinafter referred to as a virtual LDEV-ID) is designated. When receiving the IO request in which the virtual LDEV-ID is designated, the storage apparatus 10 performs processing corresponding to the IO request on the LDEV associated with the designated virtual LDEV.

Also, the first storage apparatus 10 and the second storage apparatus 10 can provide the host computer 2 with virtual LDEVs to which the same virtual LDEV-ID is given as an identifier of the virtual LDEV (hereinafter referred to as a virtual LDEV-ID). In other words, each storage apparatus 10 (the first storage apparatus 10 and the second storage apparatus 10) can provide the host computer 2 with different LDEV storage areas of the different storage apparatuses 10 to which the same virtual LDEV-ID corresponds as if they were a single storage area.

Figure 2:
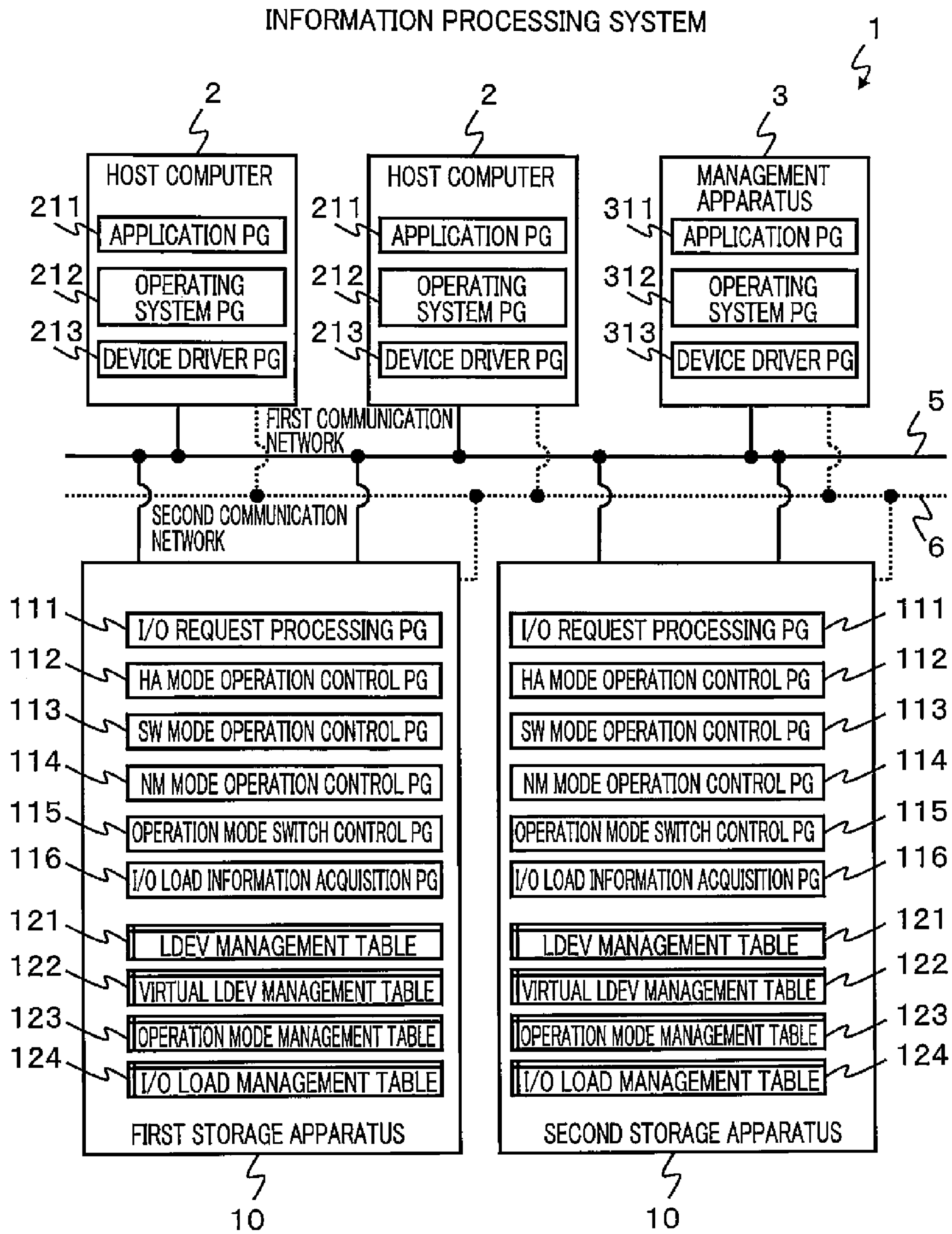
FIG. 2 is a drawing showing main programs and data which are stored in main components of the information processing system 1.

FIG. 2 shows main programs and main data which are stored in the main components of the information processing system 1. Note that in the following description, "program" is also denoted as "PG".

The main functions provided by the host computer 2 are implemented by the central processing unit 21 of the host computer 2 reading and executing programs stored in the storage device 22. Also, the main functions provided by the management apparatus 3 are implemented by the central processing unit 31 of the management apparatus 3 reading and executing programs stored in the storage device 32. Also, the main functions provided by the storage apparatus 10 are implemented by at least one of the communication control unit 11, data transfer device 12, and drive control unit 13 in the storage apparatus 10 reading and executing programs stored in the shared memory 15. Note that, the program stored in the shared memory 15 may be stored in the storage drive 17.

As shown in FIG. 2, the storage device 22 of the host computer 2 stores an application PG 211, an operating system PG 212, and a device driver PG 213.

Among the above, the application PG 211 implements functions relating to, for example, a bank's automated teller services, or Internet web page browsing services.

The operating system PG 212 implements functions relating to process control executed in the host computer 2 (such as process execution management, process scheduling, or management of a storage area to be used by the process), functions relating to a file system, functions relating to file share, or the like.

The device driver PG 213 implements functions relating to control of hardware and peripheral devices included in the host computer 2.

Here, an IO request to be transmitted from the host computer 2 to the storage apparatus 10 is generated by executing at least one of the application PG 211, the operating system PG 212, and the device driver PG 213.

As shown in FIG. 2, the storage device 32 of the management apparatus 3 stores an application PG 311, an operating system PG 312, and a device driver PG 313 as main programs.

Among the above, the application PG 311 implements functions relating to services relating to management or maintenance of the information processing system 1.

The operating system PG 312 implements functions relating to process control executed in the management apparatus 3 (such as execution management, scheduling, management of a storage area used by the process, or handling of an interruption request), functions relating to a file system, functions relating to file share, or the like.

The device driver PG 313 implements functions relating to control of hardware and peripheral devices which are included in the management apparatus 3.

As shown in FIG. 2, the storage apparatus 10 stores as main programs, an IO request processing PG 111, an HA mode operation control PG 112, an SW mode operation control PG 113, an NM mode operation control PG 114, an operation mode switch control PG 115, and an IO load information acquisition PG 116. These programs are stored in, for example, the share memory 15 of the storage apparatus 10, a storage device of the communication control unit 11, a storage device of the drive control unit 13, a storage device of the data transfer device 12, or the like.

Among the above, the IO processing PG 111 implements processing (hereinafter referred to as IO processing) in response to the IO request which is received by the storage apparatus 10 from the host computer 2, so as to implement functions to perform basic operations when a response is returned to the host computer 2 and functions to provide a virtual LDEV to the host computer 2.

The HA mode operation control PG 112 implements a function to operate the storage apparatus 10 in an "HA mode" (first operation mode) among the operation modes to be described later when the data which is received by the storage apparatus 10 from the host computer 2 is managed by dual management to be described later.

The SW mode operation control PG 113 implements a function to operate the storage apparatus 10 in an "SW mode" (second operation mode) among the operation modes to be described later when the data which is received by the storage apparatus 10 from the host computer 2 is managed by IO request transfer method to be described later.

The NM (Normal) mode operation control PG 114 achieves a function to operate the storage apparatus 10 in an "NM mode" (a third operation mode) among operation modes to be described later when the data which is received by the storage apparatus 10 from the host computer 2 is managed by IO request transfer method or a normal method to be described later.

Note that, with regard to the area of the virtual LDEV managed under the "HA mode" on the first storage apparatus 10 side, the corresponding area of the virtual LDEV on also the second storage apparatus 10 side is managed under the "HA mode". Additionally, with regard to the area of the virtual LDEV managed under the "NM mode" on the first storage apparatus 10 side, the corresponding area of the virtual LDEV on the second storage apparatus 10 side is managed under the "SW mode". Further, with regard to the area of the virtual LDEV managed under the "SW mode" on the first storage apparatus 10 side, the corresponding area of the virtual LDEV on the second storage apparatus 10 side is managed under the "NM mode".

The operation mode switch control PG 115 implements a function relating to switching of the operation modes of the storage apparatus 10.

The IO load information acquisition PG 116 acquires information (such as access frequency per unit time (the IO request count received from the host computer 2), hereinafter also referred to as IO load information) relating to an IO load for each page of the virtual LDEV to be described later. The acquired information is used for switching the operation modes to be described later.

As shown in FIG. 2, the storage apparatus 10 stores an LDEV management table 121, a virtual LDEV management table 122, an operation mode management table 123, and an IO load management table 124 as main data. These tables are stored in, for example, the shared memory 15 of the storage apparatus 10, a storage device of the communication control unit 11, a storage device of the drive control unit 13, a storage device of the data transfer device 12, or the like.

Among the above, the LDEV management table 121 manages correspondence between the storage drives 17 and LDEVs. FIG. 3 shows an example of the LDEV management table 121 which is stored in the first storage apparatus 10, while FIG. 4 shows an example of the LDEV management table 121 which is stored in the second storage apparatus 10.

As shown in these figures, the LDEV management table 121 is configured with at least one record including items of a RAID group ID 311 in which an identifier of a RAID group (hereinafter referred to as RAID-ID) is set and LDEV-ID 312 in which an identifier of LDEV (hereinafter referred to as LDEV-ID) configured using a RAID group specified by the RAID group ID is set. Note that in these figures, values in brackets attached to RAID group ID 311 is an identifier (hereinafter referred to as drive ID) of the storage drive 17 constituting that RAID group.

The virtual LDEV management table 122 manages correspondences among the virtual LDEV, the LDEV of the first storage apparatus 10, and the LDEV of the second storage device 10. FIG. 5 shows an example of the virtual LDEV management table 122 which is stored in the first storage apparatus 10, while FIG. 6 shows an example of the virtual LDEV management table 122 which is stored in the second storage apparatus 10.

As shown in these figures, the virtual LDEV management table 122 is configured of at least one record including items of a virtual production number 411, a virtual LDEV 412, a first LDEV 413, a first LDEV attribute 414, a second LDEV 415, a second LDEV attribute 416, and path information 417.

Among the items, in the virtual production number 411, a virtual production number of the virtual LDEV (a production number which is virtually given) is set. Note that a unique production number (hereinafter referred to as a real production number) is assigned to each storage apparatus 10 when, for example, a storage apparatus 10 is manufactured. Each storage apparatus 10 itself stores a real production number which is assigned to the apparatus, and the host computer 2 designates the storage apparatus 10 in a communication destination with the real production number.

In the virtual LDEV, an identifier of a virtual LDEV (virtual LDEV-ID) is set.

In the first virtual LDEV 413, there is set the LDEV-ID of the LDEV of the first storage apparatus 10 which is associated with the virtual LDEV is set. In the first attribute 414, there is set information ("Master" or "Slave") indicating an attribute to be described later which is assigned to the LDEV.

In the second LDEV 415, there is set the LDEV-ID of the LDEV of the second storage apparatus 10 which is associated with the virtual LDEV. In the second attribute 416, there is set information ("Master" or "Slave") indicating an attribute to be described later which is assigned to the LDEV.

In the path information 417, there is set information (hereinafter referred to as path information) specifying the path to be used when the first storage apparatus 10 and the second storage apparatus 10 communicate with each other via the first communication network 5. Path information is expressed in combination of, for example, an identifier (for example, WWN (World Wide Name)) of a port of the communication control unit 11 to be the transmission source (an initiator) and an identifier (for example, WWN) of a port of the communication control unit 11 to be the transmission destination (a target).

The operation mode management table 123 manages operation modes to be described later, which are respectively set for each management unit (hereinafter referred to as a page) of the storage area of the virtual LDEV. FIG. 7 shows an example of the operation mode management table 123 which is stored in the first storage apparatus 10, while FIG. 8 shows an example of the operation mode management table 123 which is stored in the second storage apparatus 10.

As shown in these figures, the operation mode management table 123 is configured with the following items of a virtual LDEV 511, a page 512, an operation mode 513, and an operation mode change permission 514.

Among the above, an identifier of a virtual LDEV (virtual LDEV-ID) is set in the virtual LDEV 511.

In the page 512, there is set an identifier assigned to each page (hereinafter referred to as a page ID) is set. Note that an address showing a storage area of the virtual LDEV corresponding to the page is set in the brackets attached to the page ID.

Information (any of "HW mode", "SW mode", and "NW mode") indicating an operation mode to be described later set to the page, is set in the operation mode 513. Note that the operation mode may be set page by page, however, the way in which setting is performed is not limited to the above and the mode may be managed in units different from page units. For example, the operation mode may be managed in units of virtual LDEVs.

Information ("Y" or "N") indicating whether the operation mode of that page is permitted to be automatically changed is set in the operation mode change permission 514. As for the page in which the operation mode is not permitted to be changed (the page in which "N" is set), a change of operation modes to be described later is prohibited.

The IO load management table 124 manages IO load information, for each page of the virtual LDEV, acquired by the IO load information acquisition PG 116. FIG. 9 shows an example of the IO load management table 124 which is stored in the first storage apparatus 10, while FIG. 10 shows an example of the IO load management table 124 which is stored in the second storage apparatus 10.

Note that in the following description, the IO loads are measured page by page of the virtual LDEV, however, the units in which the IO loads are measured may be changed according to management units of the operation mode. Further, the operation mode change upper limit threshold, the operation mode change lower limit threshold as well as the operation mode change upper limit threshold (Read) may also be managed in virtual LDEV units. For example, the IO loads may be measured for each virtual LDEVs and managed in the IO load management table when the mode is managed in virtual LDEV units.

As shown in these figures, the IO load management table 124 is configured with records including items of LDEV 611, a page 612, an access count (total) 613, an access count (Read) 614, an access count (Write) 615, an operation mode change upper limit threshold 616, an operation mode change lower limit threshold 617, and an operation mode change upper limit threshold (Read) 618. Hereinafter, explanation on each item will be given with the IO load management table 124 stored in the first storage apparatus 10 of FIG. 9 and the second storage apparatus 10 of FIG. 10, as an example.

First of all, an identifier of virtual LDEV (virtual LDEV-ID) is set in the virtual LDEV 611.

Page ID of that virtual LDEV is set in the page 612. Note that an address specifying the storage area of the virtual LDEV corresponding to the page is set in the brackets attached to the page ID.

In the access count (total) 613, there is set the access count (for example, the sum of the numbers of received write requests and received read requests) acquired per unit time that had occurred to each page for the first storage apparatus 10 (the second storage apparatus 10 in the case of FIG. 10).

In the access count (Read) 614, there is set the access count (for example, the number of read request received) acquired per unit time that had occurred to each page for the first storage apparatus 10 (the second storage apparatus 10 in the case of FIG. 10).

In the access count (Write) 615, there is set the access count (for example, the number of write request received) acquired per unit time that had occurred to each page for the first storage apparatus 10 (the second storage apparatus 10 in the case of FIG. 10).

In the operation mode change upper limit threshold 616, there is set an upper limit threshold (a first upper limit threshold, a second upper limit threshold) of the access count (the (total) value of the access count 613).

In the operation mode change lower limit threshold 617, there is set a lower limit threshold of the access count (the (total) value of the access count 613).

In the operation mode change upper limit threshold (Read) 618, there is set an upper limit threshold (a third upper limit threshold, a fourth upper limit threshold) of the access count (a value of the access count (Read) 614).

=Basic Operations of the Storage Apparatus=

When the communication control unit 11 of the storage apparatus 10 receives an IO request from the host computer 2, the storage apparatus 10 basically operates as follows.

For example, when the storage apparatus 10 receives a write request as an IO request from the host computer 2, the communication control unit 11 firstly notifies the data transfer device 12 of the event.

When receiving the notification, the data transfer device 12 generates a drive write instruction corresponding to the write request, then transmits the write instruction to the drive control unit 13, and stores write data for the write request into the cache memory 14.

The communication control unit 11 transmits a response (a write completion report) for the write request to the host computer 2 after confirming that the data transfer device 12 had stored the write data in the cache memory 14.

When receiving the drive write instruction from the data transfer device 12, the drive control unit 13 registers this in a write processing queue. The drive control unit 13 sequentially reads the drive write instruction registered in the write processing queue, and reads write data designated thereto from the cache memory 14, and then writes the read data in the storage drive 17.

In addition, for example, when the storage apparatus 10 receives a read request as an IO request from the host computer 2, the communication control unit 11 firstly notifies the drive control unit 13 of the event.

When receiving the notification, the drive control unit 13 reads the data which is designated by aforementioned data read request (for example, the one designated by LDEV-ID (virtual LDEV-ID) and LBA (Logical Block Address)). Note that the reading of the data from the storage drive 17 is omitted if the already-read data exists in the cache memory 14.

The data read by the drive control unit 13 is read by the data transfer device 12 from the cache memory 14, and the communication control unit 11 transmits the read data as a response to the read request to the host computer 2.

=Virtual LDEV=

As described above, the first storage apparatus 10 and the second storage apparatus 10 both can provide the host computer 2 with virtual LDEVs to which a same virtual LDEV-ID is assigned. Also, when respectively receiving IO requests for virtual LDEV-IDs from the host computer 2, the first storage apparatus 10 and the second storage apparatus 10 behave toward the host computer 2 as if the LDEVs (the first LDEV and the second LDEV associated with the virtual LDEV-ID) separately included in each of the first storage apparatus 10 and second storage apparatus 10 were LDEVs of the alternate path configuration set to a single storage apparatus.

This type of mechanism is implemented using the virtual production number 411 and the virtual LDEV 412 which are managed by the above-described virtual LDEV management table 122. Hereinafter, the operations of the first storage apparatus 10 and the second storage apparatus 10 regarding this mechanism are described.

The storage apparatus 10 (the first storage apparatus 10 or the second storage apparatus 10) transmits a login command to the host computer 2 when the host computer 2 and the storage apparatus 10 are coupled via a communication cable (the first communication network 5). Note that the host computer 2 may be made to transmit a login command to the storage apparatus 10 (the first storage apparatus 10 or the second storage apparatus 10).

Thereafter, at least the following two processings are executed in the login sequence. First, the host computer 2 issues an apparatus information acquisition request to the storage apparatus 10. The storage apparatus 10 that has received the apparatus information acquisition request sends to the host computer 2 a virtual product number assigned to the storage apparatus 10 itself and a port ID (for example, WWN assigned to an HBA port) of the communication control unit 11 of the storage apparatus 10 itself. Next, when receiving the virtual product number and the port ID from the storage apparatus 10, the host computer 2 requests (for example, requests by an Inquiry command in accordance with the SCSI standards) for information of the virtual LDEV (virtual LDEV-ID) from the storage apparatus 10 to be the transmission destination of the IO request.

Note that the host computer 2 specifies the storage apparatus 10 to be a transmission destination of the IO request with the received virtual product number. Also, the host computer 2 generates the request without distinguishing the virtual product number from the product number which is uniquely assigned to each storage apparatus 10 (hereinafter also referred to as a real product number).

When receiving the request, the storage apparatus 10 (the storage apparatus 10 specified by the virtual product number) returns to the host computer 2 information including the virtual product number, the port ID and information of the virtual LDEV (virtual LDEV-ID). Then the host computer 2 receiving a response from the storage apparatus 10 recognizes the storage apparatus 10 as a single virtual storage apparatus instead of a plurality of physical storage apparatuses (the first storage apparatus 10 and the second storage apparatus 10). Note that to prevent the host computer 2 from making a wrong recognition, the same virtual product number is used for the product number included in the response to the apparatus information acquisition request and the product number included in the response to the Inquiry request.

In the IO request thereafter, the host computer 2 generates an IO request in which the port ID and information of the virtual LDEV (virtual LDEV-ID) included in the information are designated as an address to transmit to the storage apparatus 10.

When receiving the IO request, the storage apparatus 10 performs processing in response to the IO request for the storage area designated by the IO request (the storage area specified by the port ID and the virtual LDEV).

In this manner, the storage apparatus 10 presents, to the host computer 2, a virtual product number commonly assigned to each of the plurality of storage apparatuses 10 and virtual LDEV commonly assigned to different LDEVs in the plurality of storage apparatuses 10. In this way, the host computer 2 is provided with the storage areas of the LDEVs individually included in the storage apparatuses 10 (the first LDEV and second LDEV associated with the virtual LDEV-ID) as if a single virtual LDEV assigned the virtual LDEV-ID were present.

=Data Management Method=

The storage apparatus 10 (the first storage apparatus 10, the second storage apparatus 10) can manage the data received from the host computer 2 by three data management methods to be described below. Note that in the present embodiment, the above-described page is set as a unit in the data management method. Hereinafter, each data management method is sequentially described.

<Dual Management Method>

The dual management method is a method to redundantly manage data received by the first storage apparatus 10 and the second storage apparatus 10 from the host computer 2. When the dual management method is performed, both the first storage apparatus 10 and the second storage apparatus 10 are set in an "HA mode" among the operation modes to be described later. Note that the "HA mode" may be set for each page of the virtual LDEVs or may be set for each virtual LDEV.

Figure 11:
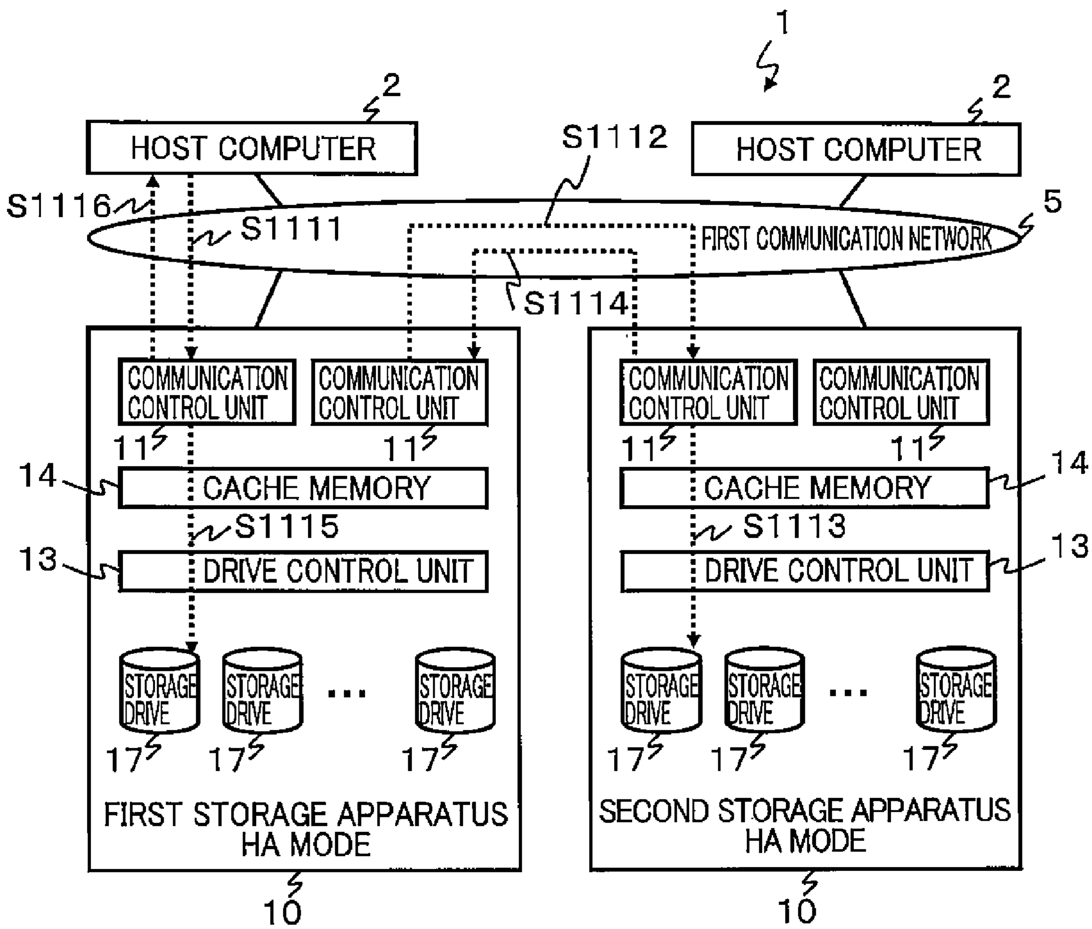
FIG. 11 is a drawing schematically illustrating an operation of the storage system when dual management method is performed.

FIG. 11 schematically shows an operation of a storage system when the dual management method is carried out. FIG. 11 shows an operation of the storage system when the first storage apparatus 10 receives a write request as an IO request from the host computer 2. Note that the following description gives an example of a case where the second storage apparatus 10 side has the later-described "Master" attribute assigned to the virtual LDEV.

As shown in FIG. 11, when receiving a write request and write data from the host computer 2 (S1111), the first storage apparatus 10 transfers the write request and the write data to the second storage apparatus 10 (S1112).

When receiving the write request and write data from the first storage apparatus 10, the second storage apparatus 10 writes the received write data in the LDEV (second LDEV) corresponding to the virtual LDEV which is designated by the write request (S1113). Note that the write request and the write data may be simply stored in the cache memory 14.

When the writing is completed, the second storage apparatus 10 transmits a response (a completion report) to the first storage apparatus 10 (S1114). Note that the response may be transmitted at the point at which the write request and the write data are stored in the cache memory 14.

When receiving the response from the second storage apparatus 10, the first storage apparatus 10 then writes the write data in the LDEV (first LDEV) corresponding to the virtual LDEV which is designated by the write request (S1115).

When the writing is completed, the first storage apparatus 10 transmits a response (a completion report) for the write request received at S1111 to the host computer 2 which is the transmission source of the write request (S1116).

Note that when the first storage apparatus 10 is assigned the later described "Master" attribute to the virtual LDEV is as follows.

First, the first storage apparatus 10 transmits a completion report, a write request and write data to the second storage apparatus 10 after the first storage apparatus 10 writes in the first LDEV associated with the virtual LDEV. Then the second storage apparatus 10 transmits a completion report to the first storage apparatus 10 after the second storage apparatus 10 writes in the second LDEV associated with the virtual LDEV, and thereafter the first storage apparatus 10 transmits a completion report on the write request to the host computer 2.

Further, when the second storage apparatus 10 receives the write request from the host computer 2, the positions of the first storage apparatus 10 and the second storage apparatus 10 are reversed, and a processing similar to that above is performed.

In addition, although the above description is given for the case where a write request is received as an IO request from the host computer 2, when the first storage apparatus 10 or the second storage apparatus 10 receives a read request from the host computer 2, the storage apparatus 10 (the first storage apparatus 10 or the second storage apparatus 10) receiving the read request carries out the above-described basic operation and returns a response to the host computer 2.

In this manner, in the dual management method, the data received from the host computer 2 is redundantly managed in both the first storage apparatus 10 and the second storage apparatus 10. Thus, availability of the data received from the host computer 2 can be increased. Further, a response can be made with data in the first LDEV of the first storage apparatus 10 to the read request received by the first storage apparatus 10, and a response can be made with data in the second LDEV of the second storage apparatus 10 to the read request received by the second storage apparatus 10 thus the performance of the entire information processing system 1 can be improved for the read request.

Note that in the dual management method, the storage apparatus 10 receiving the write request needs to wait for the completion of writing in the other storage apparatus 10. Thus, a response performance (response speed) to the host computer 2 is deteriorated.

<IO Request Transfer Method>

The IO request transfer method is a method in which only one of the first storage apparatus 10 and the second storage apparatus 10 manages the data received from the host computer 2. When the IO request transfer method is carried out, an "SW mode" among the operation modes to be described later is set to the storage apparatus 10 which does not manage the data, while an "NM mode" among the operation modes to be described later is set to the storage apparatus 10 which manages the data. The IO request transfer method is a processing method when the storage apparatus 10 set to "SW mode" receives the IO request. Note that, the operation modes in "SW mode" or the "NM mode" may be set for each page of the virtual LDEVs or may be set for each virtual LDEV s.

Figure 12:
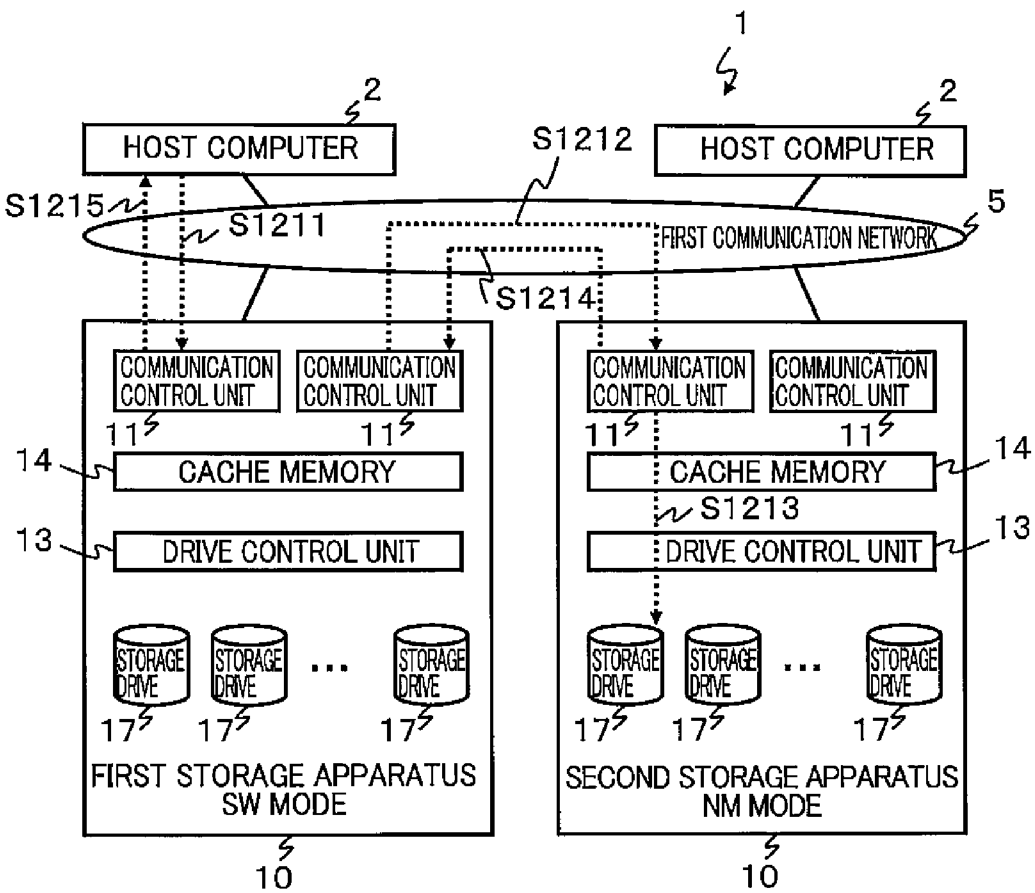
FIG. 12 is a drawing schematically illustrating an operation of the storage system when IO request transfer method is performed.

FIG. 12 schematically shows an operation of a storage system when the IO request transfer method is performed. In this example, an "SW mode" is set in the page of the virtual LDEV (or virtual LDEV) on the first storage apparatus 10 side and an "NM mode" is set in the page of the virtual LDEV (or virtual LDEV) on the second storage apparatus 10 side.

As shown in FIG. 12, when receiving an IO request (a write request or a read request) from the host computer 2 (S1211), the first storage apparatus 10 transfers the received IO request to the second storage apparatus 10 (S1212). Note that during processing S1211 and S1212, only resources of the communication control unit 11 are used among the resources which are included in the first storage apparatus 10, and resources of the cache memory 14, the drive control unit 13, and the storage drive 17 of the first storage apparatus 10 are not used. For this reason, a load on the first storage apparatus 10 is suppressed at minimum during processing S1211 and S1212.

When receiving the IO request transferred from the first storage apparatus 10, the second storage apparatus 10 carries out the basic operation for the IO request to the LDEV associated with the virtual LDEV (S1213), and transmits a response (a completion report. When the IO request is a read request, data which is further read from the storage drive 17) for the IO request to the first storage apparatus 10 (S1214).

When receiving the response from the second storage apparatus 10, the first storage apparatus 10 transmits a response (a completion report. When the IO request is a read request, data further read from the storage drive 17) for the IO request received at S1211 to the host computer 2 which is a transmission source of the IO request (S1215).

As described above, in the IO request transfer method, one of the storage apparatuses 10 has the other of the storage apparatuses 10 carry out substantive processing of the IO request received from the host computer 2. For this reason, for example, when the resources of the one of the storage apparatuses 10 (for example, resources of at least any one of the cache memory 14, the drive control unit 13, and the storage drive 17) is lacking, the deterioration of services to the host computer 2 can be effectively prevented. Also, since the operation mode of the page of the virtual LDEV (or virtual LDEV) on the second storage apparatus 10 side is set to the "NM mode", the response performance is improved as compared with that of the dual management method as for the write request which is directly received by the second storage apparatus 10 from the host computer 2.

For processing an IO request, the IO request transfer method involves transferring the IO request from one of the storage apparatuses 10 to the other of the storage apparatuses 10 and transmitting a response (such as a completion report) from the other of the storage apparatuses 10 to the one of the storage apparatuses 10. Accordingly, the first storage apparatus 10 would make a reply to the host computer 2 with a lowered response performance (response speed). For this reason, the IO request transfer method is suitable in a case, for example, where the first storage apparatus 10 side has small numbers of IOs or where resources of the first storage apparatus 10 are preferentially reserved.

<Normal Method>

In the normal method, similar to the IO request transfer method, the page of the virtual LDEV (or virtual LDEV) on the storage apparatus 10 side that does not manage data is set to "SW mode", and the page of the virtual LDEV (or virtual LDEV) on the storage apparatus 10 side that manages data is set to "NM mode". The normal method is a processing method carried out when the storage apparatus 10 set to the "NM mode" receives an IO request.

Figure 13:
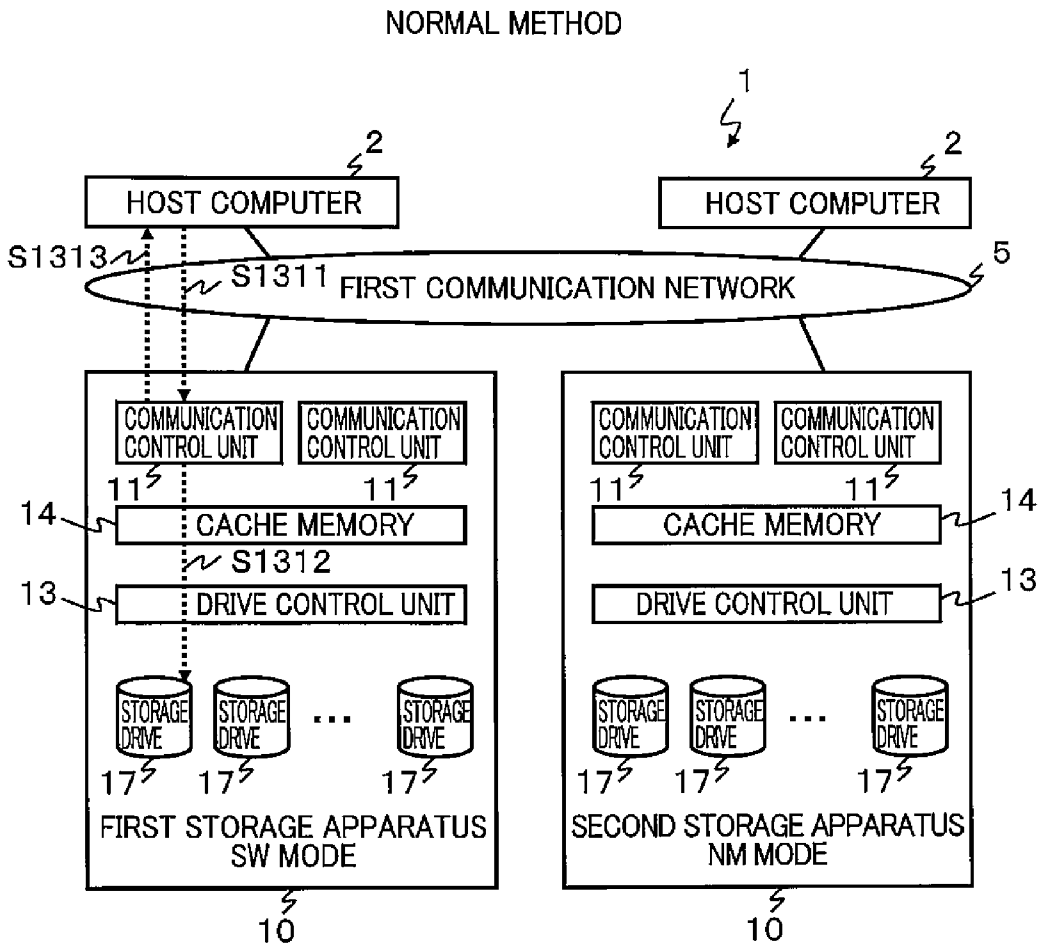
FIG. 13 is a drawing schematically illustrating an operation of the storage system when a normal method is performed.

FIG. 13 schematically shows an operation when a normal method is carried out. In other words, the processing is for the case when the second storage apparatus side receives an IO request to the virtual LDEV in the configuration shown in FIG. 12.

As shown in FIG. 13, when receiving an IO request (a write request or a read request) to the virtual LDEV from the host computer 2 (S1311), the first storage apparatus 10 carries out a basic operation for the IO request to the second LDEV associated with the virtual LDEV (S1312) and then returns a response to the IO request to the host computer 2 (S1313).

=Attribute of LDEV=

By the way, in a case where the first storage apparatus 10 and the second storage apparatus 10 simultaneously receive write requests for the same virtual LDEV from the host computer 2 when the data received from the host computer 2 is managed by the above-described dual management method, both of the storage apparatuses 10 transmit their respective write requests to the other storage apparatuses 10. As a result, there is a possibility of causing deadlock. The above-described attribute of LDEV (a first attribute, a second attribute) is used to prevent the occurrence of the deadlock.

In other words, a "Master" attribute is assigned to any one of LDEVs of the storage apparatuses 10, which are associated with the same virtual LDEV, and a "Slave" attribute is assigned to the other.

When the first storage apparatus 10 and the second storage apparatus 10 simultaneously receive write requests for the same virtual LDEV from the host computer 2, the storage apparatus 10 assigned the "Master" attribute acquires a lock for the LDEV of itself without checking the lock (or reserve) state of the other storage apparatus 10 and performs writing on the LDEV.

On the other hand, the storage apparatus 10 assigned the "Slave" attribute always transfers the write request and write data received from the host computer 2 to the storage apparatus 10 assigned the "Master" attribute so that a write processing for the aforementioned write request is carried out in the storage apparatus 10 to which the "Master" attribute is assigned in advance, and performs writing on LDEV of itself after confirming that the lock in the storage apparatus 10 assigned the "Master" attribute is released.

In this manner, when the first storage apparatus 10 and the second storage apparatus 10 simultaneously receive write requests for the same LDEV from the host computer 2, the "Slave" side performs writing on LDEV after checking the presence of a lock on the "Master" side. Accordingly, the occurrence of a deadlock can be certainly prevented. And thereby, the order in which writing is carried out can be controlled so that consistency of data can be guaranteed.

Note that in the present embodiment, write processing is first carried out in the storage apparatus 10 managing the LDEV to which "Master" attribute is assigned when receiving a write request to the virtual LDEV according to the dual management method and thereafter, write processing is carried out in the storage apparatus 10 managing the LDEV to which "Slave attribute" is assigned to prevent a deadlock from occurring.

=IO Processing According to Operation Modes=

The storage apparatus 10 performs IO processing according to the operation modes (a "HA mode", "SW mode", and "NW mode") which are set in a page of the virtual LDEV to be a target of the IO request. Hereinafter, the IO processing of the storage apparatus 10 in each operation mode is described.

<HA Mode Write Processing>

Figure 14:
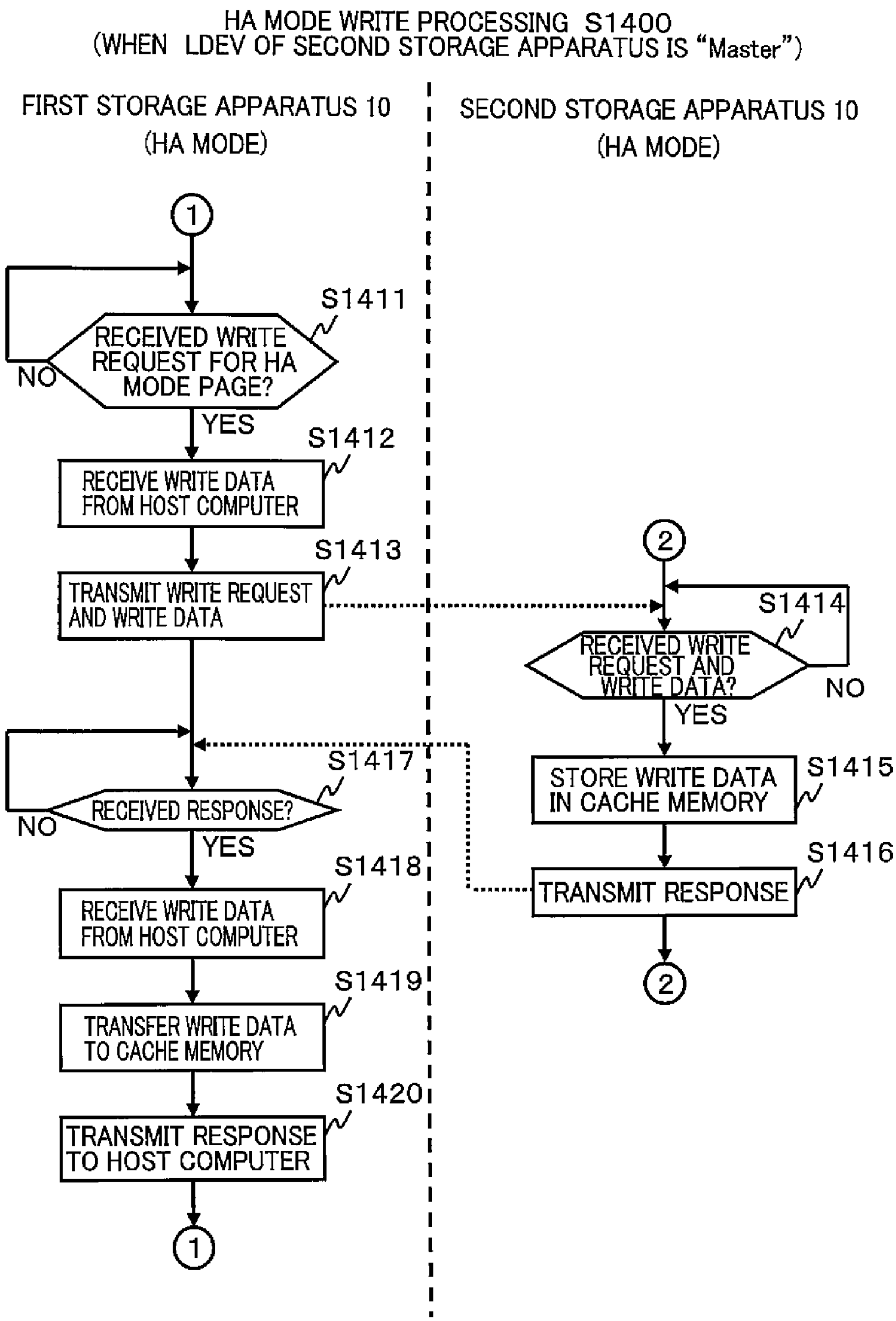
FIG. 14 is a flowchart illustrating HA mode write processing S1400.

FIG. 14 is a flowchart illustrating processing which is performed by each of the first storage apparatus 10 and the second storage apparatus 10 when the first storage apparatus 10 receives a write request for a page set to "HA mode" ("HA mode" may be set to the virtual LDEV) from the host computer 2, and attribute "Slave" is assigned to the first LDEV in the first storage apparatus associated with the virtual LDEV (hereinafter referred to as HA mode write processing S1400).

When receiving a write request for a page set to "HA mode" in the virtual LDEV (S1411: YES), the first storage apparatus 10 receives write data for that write request (S1412), and then transmits the received write request and write data to the second storage apparatus 10 (S1413).

When receiving the write request and the write data from the first storage apparatus 10 (S1414: YES), the second storage apparatus 10 stores the received write data in the cache memory 14 (S1415), and then transmits to the first storage apparatus 10 a response indicating that writing has been completed (S1416). Note that thereafter, the second storage apparatus 10 writes write data from the cache memory 14 to the second LDEV associated with the virtual LDEV.

When receiving the response from the second storage apparatus 10 (S1417: YES), the first storage apparatus 10 receives write data from the host computer 2 (S1418). Note that it is also possible that the write data received at S1412 is stored by the first storage apparatus 10 without making a request for the write data again to the host computer 2 as described above.

Subsequently, the first storage apparatus 10 stores the write data in the cache memory 14 (S1419), and, thereafter, transmits a response (a completion report) for the write request to the host computer 2 (S1420). Note that thereafter, the first storage apparatus 10 destages write data from the cache memory 14 to the first LDEV associated with the virtual LDEV.

Note that the following processing is carried out when the first LDEV associated with the virtual LDEV on the first storage 10 side is assigned the "Master" attribute.

That is, after the first storage apparatus 10 writes a write request and write data in the cache memory 14, the first storage apparatus 10 transmits a write request and write data to the second storage apparatus 10. And the second storage apparatus 10 transmits a completion report to the first storage apparatus 10 after writing data in the cache memory 14. Thereafter, the first storage apparatus 10 transmits a completion report for the write request to the host computer 2. Here, the first storage apparatus 10 destages write data from the cache memory 14 to the first LDEV associated with the virtual LDEV. The second storage apparatus 10 destages write data from the cache memory 14 to the second LDEV associated with the virtual LDEV.

<HA Mode Read Processing>

Figure 15:
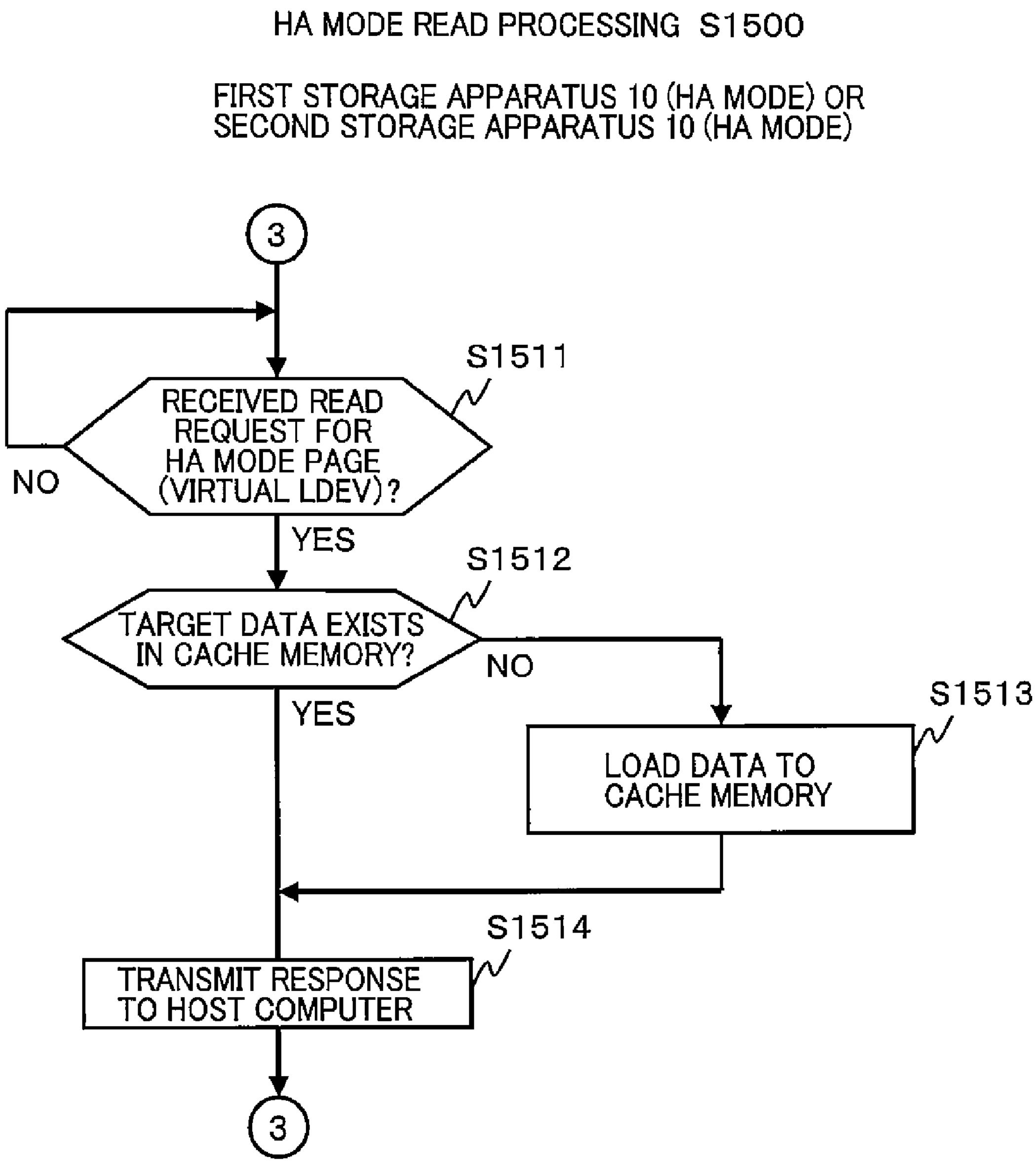
FIG. 15 is a flowchart illustrating HA mode read processing S1500.

FIG. 15 is a flowchart illustrating processing which is performed by the storage apparatus 10 (the first storage apparatus 10 or the second storage apparatus 10) when the storage apparatus 10 receives a read request for a page set to "HA mode" in the virtual LDEV ("HA mode" may be set to a virtual LDEV) from the host computer 2 (hereinafter referred to as HA mode read processing S1500). Hereinafter, the HA mode read processing S1500 is described with reference to FIG. 15.

When receiving a read request for a page set to "HA mode" ("HA mode" may be set to a virtual LDEV) (S1511: YES), the storage apparatus 10 determines whether data which is a read target of the read request (hereinafter referred to as target data) is present in the cache memory 14 (staging is performed or not) (S1512).

When the target data is present in the cache memory 14 (S1512: YES), the storage apparatus 10 transmits a response to the read request to the host computer 2 together with the data (S1514).

On the other hand, when the target data is not present in the cache memory 14 (S1512: NO), the storage apparatus 10 loads the target data from the storage drive 17 providing storage area for the first LDEV or the second LDEV associated with the virtual LDEV to the cache memory 14 (S1513), and, thereafter, transmits a response to the read request to the host computer 2 together with the loaded data (S1514).

<SW Mode Write Processing>

Figure 16:
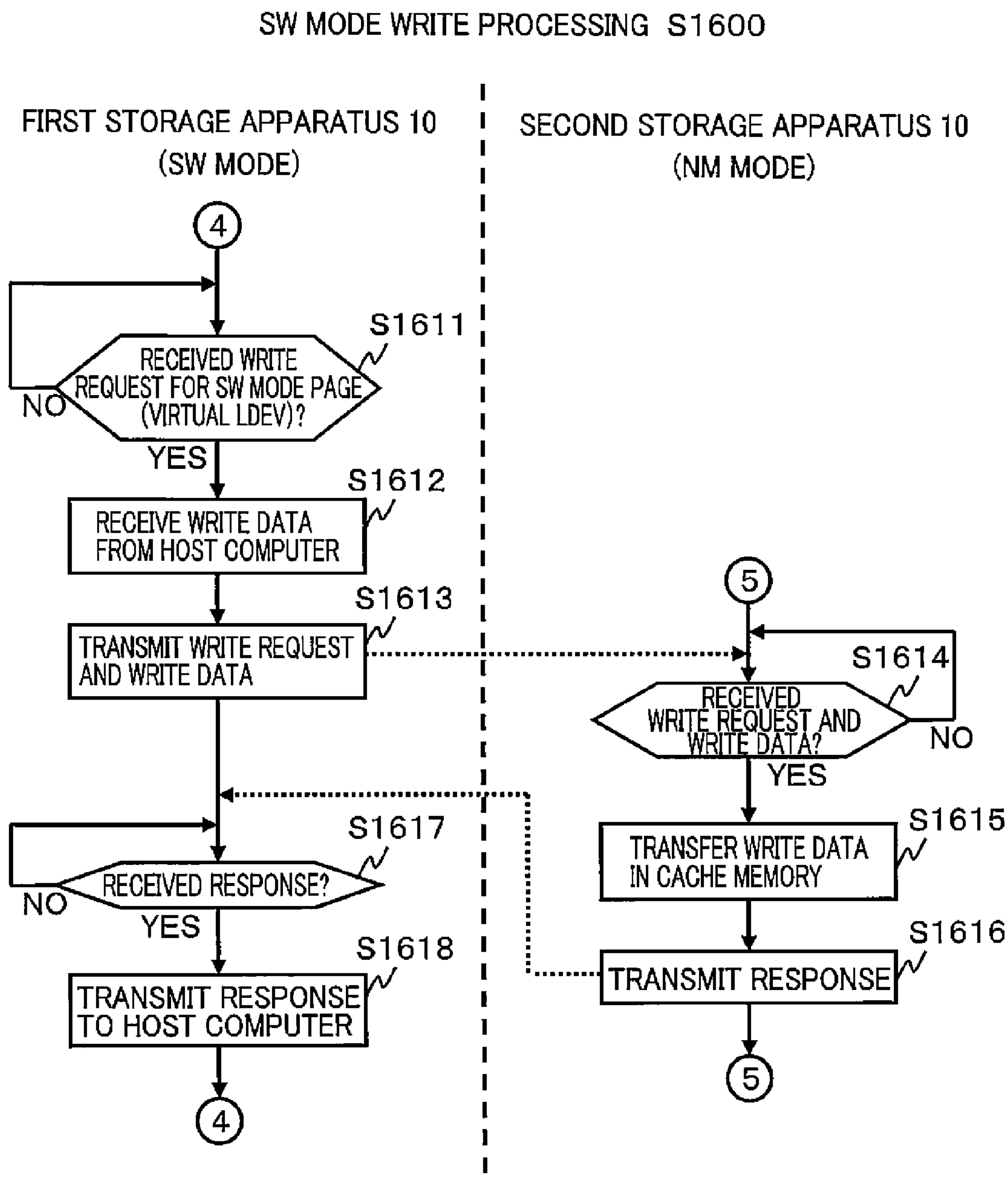
FIG. 16 is a flowchart illustrating SW mode write processing S1600.

FIG. 16 is a flowchart illustrating processing (hereinafter referred to as SW mode write processing S1600) which is performed by each of the first storage apparatus 10 and the second storage apparatus 10 when the first storage apparatus 10 receives from the host computer 2 a write request for a page in the virtual LDEV set to "SW mode" ("SW mode" may be set to the virtual LDEV). Hereinafter, the SW mode write processing S1600 is described with reference to FIG. 16.

When receiving a write request for a page set to "SW mode" ("SW mode" may be set to the virtual LDEV) (S1611: YES), the first storage apparatus 10 receives write data for the write request from the host computer 2 (S1612), and then transmits the received write request and write data to the second storage apparatus 10 (S1613). Note that when the processing of S1611 to S1613 is carried out, only resources of the communication control unit 11 are used and resources of the cache memory 14, the drive control unit 13, and the storage drive 17 are not used.

When receiving the write request and write data from the first storage apparatus 10 (S1614: YES), the second storage apparatus 10 stores the received write data in the cache memory 14 (S1615), and then transmits a response indicating that writing of the data is completed to the first storage apparatus 10 (S1616). Note that thereafter, the second storage apparatus 10 writes write data from the cache memory 14 to the second LDEV associated with the virtual LDEV.

When receiving the response from the second storage apparatus 10 (S1617: YES), the first storage apparatus 10 transmits a response (a completion report) for the write request to the host computer 2 (S1618).

<SW Mode Read Processing>

Figure 17:
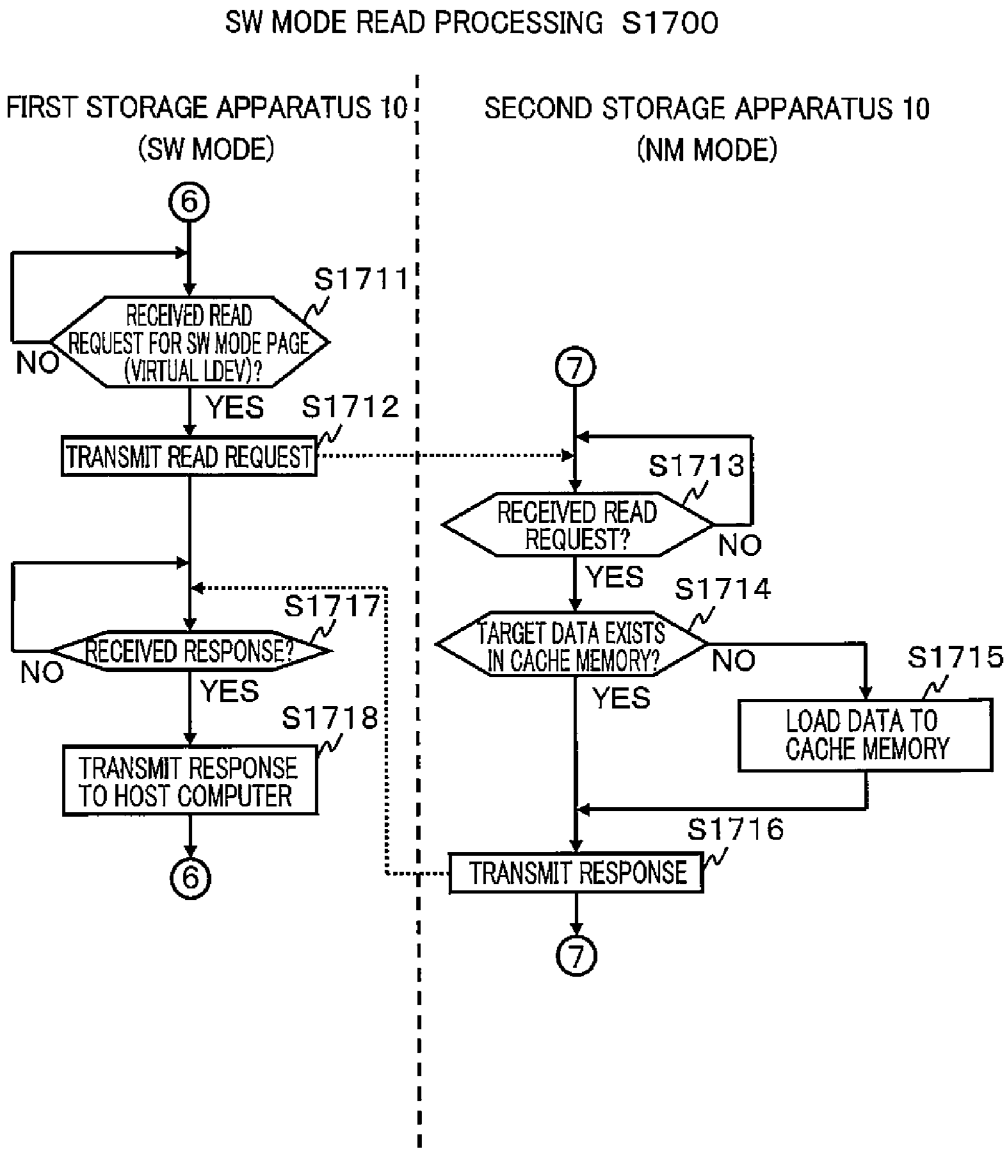
FIG. 17 is a flowchart illustrating SW mode read processing S1700.

FIG. 17 is a flowchart illustrating processing (hereinafter referred to as SW mode read processing S1700) which is performed by each of the first storage apparatus 10 and the second storage apparatus 10 when the first storage apparatus 10 receives from the host computer 2 a read request for a page in the virtual LDEV set to "SW mode" ("SW mode" may be set to the virtual LDEV). Hereinafter, the SW mode read processing S1700 is described with reference to FIG. 17.

When receiving a read request for a page in the virtual LDEV set to "SW mode" ("SW mode" may be set to the virtual LDEV) (S1711: YES), the first storage apparatus 10 transmits the received read request to the second storage apparatus 10 (S1712).

When receiving the read request from the first storage apparatus 10 (S1713: YES), the second storage apparatus 10 determines whether the data which is a read target of the read request (hereinafter referred to as target data) is present in the cache memory 14 (S1714).

When the target data is present in the cache memory 14 (S1714: YES), the second storage apparatus 10 transmits a response to the read request to the first storage apparatus 10 together with the data (S1716).

On the other hand, when the target data does not exist in the cache memory 14 (S1714: NO), the second storage apparatus 10 loads the target data from the storage drive 17 configuring the second LDEV for the virtual LDEV to the cache memory 14 (S1715), and, thereafter, transmits a response to the first storage apparatus 10 together with the loaded data (S1716).

When receiving the response from the second storage apparatus 10 (S1717: YES), the first storage apparatus 10 transmits a response (a completion report) for the read request to the host computer 2 together with the loaded data which is received from the second storage apparatus 10 together with the response (S1718).

<NM Mode Write Processing>

Figure 18:
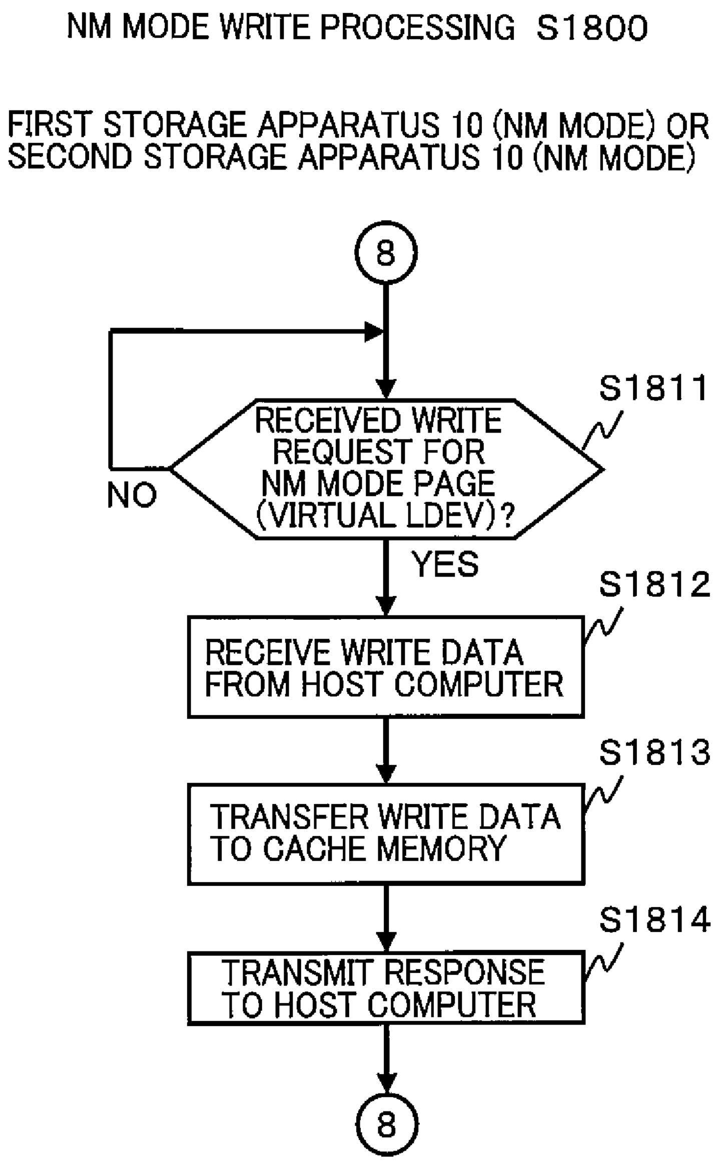
FIG. 18 is a flowchart illustrating NM mode write processing S1800.

FIG. 18 is a flowchart illustrating processing which is carried out by the storage apparatus 10 (the first storage apparatus 10 or the second storage apparatus 10) receiving a write request when the storage apparatus 10 receives the write request for a page in the virtual LDEV set to "NM mode" ("NM mode" may be set to the virtual LDEV) from the host computer 2 (hereinafter referred to as NM mode write processing S1800). Hereinafter, the NM mode write processing S1800 is described with reference to FIG. 18.

When receiving a write request for a page in the virtual LDEV set to "NM" mode" ("NM mode" may be set to the virtual LDEV) (S1811: YES), the storage apparatus 10 receives write data for the write request from the host computer 2 (S1812).

Subsequently, the storage apparatus 10 stores the write data in the cache memory 14 for implementation (S1813) and, thereafter, transmits a response (a completion response) for the write request to the host computer 2 (S1814). Further thereafter, the storage apparatus 10 stores the write data from the cache memory 14 in the LDEV associated with the virtual LDEV.

<NM Mode Read Processing>

Figure 19:
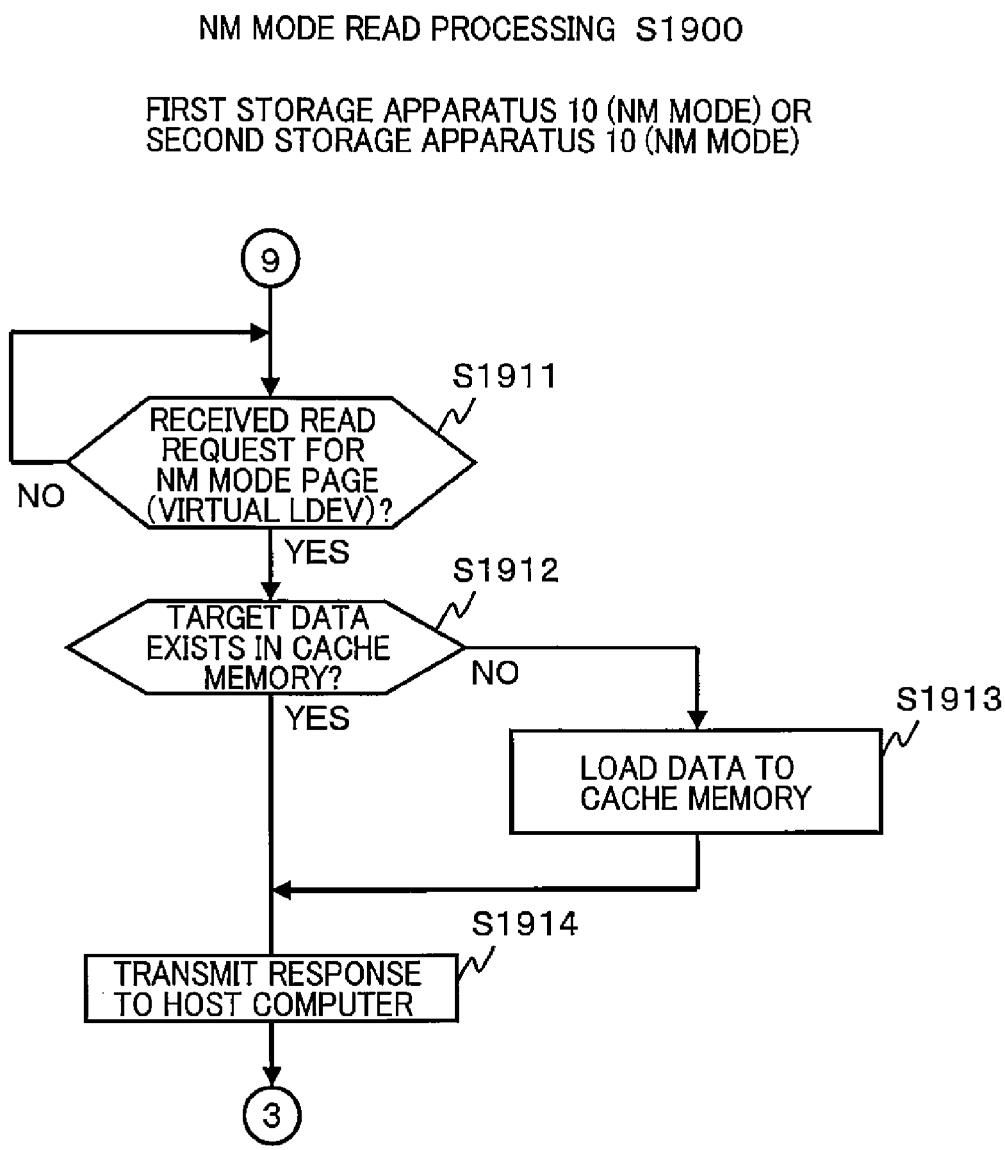
FIG. 19 is a flowchart illustrating NM mode read processing S1900.

FIG. 19 is a flowchart illustrating processing which is performed by the storage apparatus 10 (the first storage apparatus 10 or the second storage apparatus 10) receiving a read request when the storage apparatus 10 receives the read request for a page in the virtual LDEV set to "NM mode" ("NM mode" may be set to the virtual LDEV) from the host computer 2 (hereinafter referred to as NM mode read processing S1900). Hereinafter, the NM mode read processing S1900 is described with reference to FIG. 19.

When receiving a read request for a page set to "NM mode" ("NM mode" may be set to the virtual LDEV) (S1911: YES), the storage apparatus 10 determines whether data which is a read target of the read request (hereinafter referred to as target data) is present in the cache memory 14 (whether staging is performed)(S1912).

When the target data is present in the cache memory 14 (S1912: YES), the storage apparatus 10 transmits a response to the read request to the host computer 2 together with the data (S1914).

On the other hand, when the target data is not present in the cache memory 14 (S1912: NO), the storage apparatus 10 loads the target data from the storage drive 17 providing the LDEV associated with the virtual LDEV to the cache memory 14 (S1913), and then transmits a response to the read request to the host computer 2 together with the loaded data (S1914).

=Change of Data Management Method According to IO Load=

The management apparatus 3 determines an operation mode to be set for each page based on the contents (IO load of each page) of the IO load management table 124 of each of the first storage apparatus 10 and the second storage apparatus 10 and sets the operation mode of each page so that the operation mode of each page would be the determined operation mode (sets the contents of the operation mode management table 123 of each of the first storage apparatus 10 and the second storage apparatus 10). With this operation, the data received from the host computer 2 is managed according an appropriate data management method. Thus, the resources of the storage apparatus 10 can be effectively used and a response performance to the host computer 2 can be secured.

Figure 20:
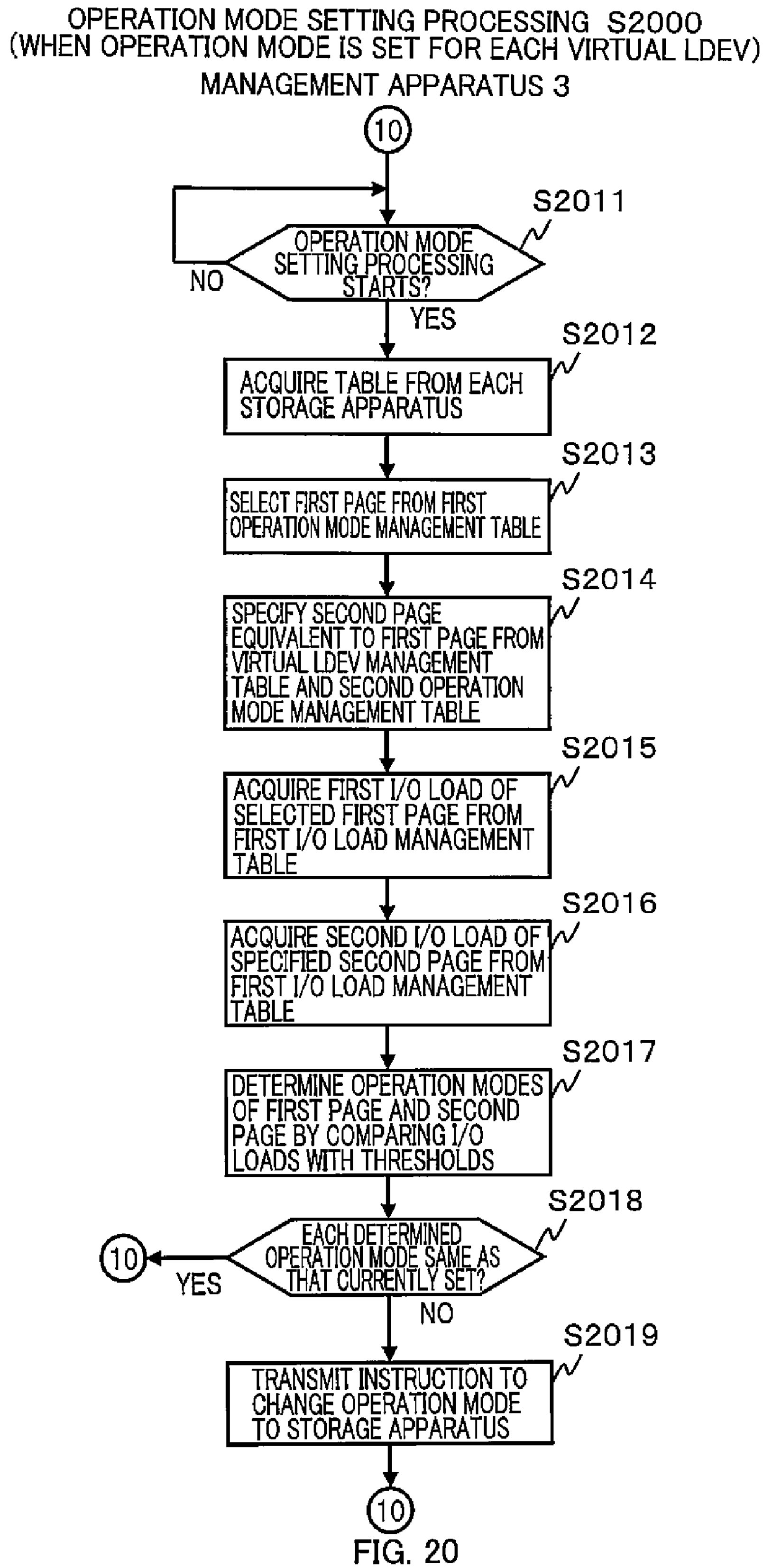
FIG. 20 is a flowchart illustrating operation mode setting processing S2000.

FIG. 20 is a flowchart illustrating processing (hereinafter referred to as operation mode setting processing S2000) of setting contents of the operation mode management table 123 of the first storage apparatus 10 and the second storage apparatus 10 so that the management apparatus 3 determines an operation mode of each page and an operation mode of each page would be the determined operation mode. Hereinafter, description is given with reference to FIG. 20.

When timing to start processing relating to operation mode setting arrives (S2011: YES), the management apparatus 3 firstly acquires tables (the virtual LDEV management table 122, the operation mode management table 123, the IO load management table 124) to be used for the aforementioned processing from each storage apparatus 10 (the first storage apparatus 10 and the second storage apparatus 10) (S2012). Note that not all the information included in the table but a part of the information necessary for the following processings may be acquired.

Note that the management apparatus 3 determines the arrival of a timing to start processing relating to operation mode setting when, for example, an administrator or the like clearly makes an instruction to the management apparatus 3 or when the time scheduled in advance (designated as needed, on a regular basis or the like) arrives. Also, the tables need not be acquired upon arrival of the timing, but may be acquired as needed from the storage apparatus 10.

Next, the management apparatus 3 selects a page of a virtual LDEV (hereinafter referred to as a first page) from the operation mode management table 123 (hereinafter referred to as the first operation mode management table 123) acquired from the first storage apparatus 10 (S2013).

Subsequently, based on the virtual LDEV management table 122 and the operation mode management table acquired from the second storage apparatus 10 (hereinafter referred to as the second operation mode management table 123), the management apparatus 3 specifies a page equivalent to the first page selected at S2013 (in other words, a page of LDEV having the virtual LDEV-ID including the first page in the first storage apparatus 10, the page equivalent to the first page (a page in which the same data redundantly managed is stored) in the virtual LDEV in the second storage apparatus, and hereinafter referred to as a second page)(S2014).

Thereafter, the management apparatus 3 acquires an IO load (at least one value among access count (total) 613, access count (Read) 614, and access count (Write) 615, and hereinafter referred to as the first IO load) of the first page selected at S2013 from the IO load management table 124 (hereinafter referred to as the first IO load management table 124) acquired from the first storage apparatus 10 (S2015).

Also, the management apparatus 3 acquires an IO load (at least one value among access count (total) 613, access count (Read) 614, and access count (Write) 615, and hereinafter referred to as the second IO load) of the second page specified at S2014 from the IO load management table 124 (hereinafter referred to as the second IO load management table 124) acquired from the second storage apparatus 10 (S2016).

Next, the management apparatus 3 determines an operation mode to be set for each of the first page and the second page based on the first IO load acquired at S2015 and the second IO load acquired at. S2016.

For example, when a ratio of the second IO load to the first IO load exceeds a predetermined threshold (the second IO load>>the first IO load), the managementapparatus 3 selects the IO request transfer method in view of improving the response performance to the host computer 2 as a whole storage system by concentrating the load on the second storage apparatus 10 side, and determines the operation mode to be set to the first page as the "SW mode" and the operation mode to be set to the second page as the "NM mode".

Specifically, for example, the management apparatus 3 determines the operation mode to be set in the first page as the "SW mode" and the operation mode to be set in the second page as the "NM mode" when the second IO load (the access count (total) 613 value in the second IO load management table 124) exceeds an upper limit threshold (the operation mode change upper limit threshold 616 value of the second IO load management table 124) and the first IO load (the access count (total) 613 value in the first IO load management table 124) is smaller than a lower limit threshold (the operation mode change lower limit threshold 617 value in the first IO load management table 124).

Also, for example, when the ratio of the first IO load to the second IO load exceeds a predetermined threshold (the first IO load>>the second IO load), the management apparatus 3 selects the IO request transfer method in view of improving response performance to the host computer 2 as a whole storage system by concentrating loads on the first storage apparatus 10 side, and determines the operation mode to be set in the first page to "NM mode" and the operation mode to be set in the second page to "SW mode".

Specifically, for example, the management apparatus 3 determines the operation mode to be set in the first page to "NM mode" and the operation mode to be set in the second page to "SW mode" when the second IO load is smaller than the lower limit threshold (the operation mode change lower limit threshold 617 value in the second IO load management table 124) and the first IO load exceeds the upper limit threshold (the operation mode change upper limit threshold 616 value in the first IO load management table 124).

Also, for example, when both the first IO load and the second IO load are large, the management apparatus 3 selects the dual management method in view of improving availability of the data received from the host computer 2 and determines the operation mode to be set in the first page and the second page to "HA mode".

Specifically, for example, the management apparatus 3 determines the operation mode to be set in the first page and the second page to "HA mode" when the first IO load (the access count (total) 613 value in the first IO load management table 124) exceeds the first upper limit threshold (the operation mode change upper limit threshold 616 value in the first IO load management table 124) and the second IO load (the access count (total) 613 value in the second IO load management table 124) exceeds the second upper limit threshold (the operation mode change upper limit threshold 616 value in the second IO load management table 124).

Further, both the first IO load and the second IO load may determine whether or not the load due to a read request is heavy. This is because the IO load on the storage apparatus 10 by a read request is lighter compared to a write request, so the effect on the response performance to the host computer 2 is small even when the dual management method is selected.

Specifically, the management apparatus 3 determines the operation mode to be set in the first page and the second page as the "HA mode" when the first IO load (the access count (total) 613 value in the first IO load management table 124) exceeds the first upper limit threshold (the operation mode change upper limit threshold 616 value of the first IO load management table 124), and the second IO load (the access count (total) 613 value in the second IO load management table 124) exceeds the second upper limit threshold (the operation mode change upper limit threshold 616 value of the second IO load management table 124), and the first IO load for the read request (the access count (Read) 614 value in the first IO load management table 124) exceeds the third upper limit threshold (the operation mode change upper limit threshold (Read) 618 value of the first IO load management table 124), and the second IO load for the read request (the access count (Read) 614 value in the second IO load management table 124) exceeds the fourth upper limit threshold (the operation mode change upper limit threshold (Read) 618 value of the second IO load management table 124).

When both the first IO load and the second IO load are not in any of the aforementioned states, the current mode is maintained without being changed.

Subsequently, the management apparatus 3 refers to the first operation mode management table 123 and the second operation mode management table 123, and determines whether the operation mode of each of the first page and the second page determined at S2017 is the same as the currently-set operation mode (S2018). When the determined operation mode is the same as the currently-set operation mode (S2018: YES), the step returns to the processing of S2011.

On the other hand, when the determined operation mode is different from the currently-set operation mode (S2018: NO), the management apparatus 3 transmits an instruction to change the operation mode (hereinafter referred to as an operation mode change instruction) to the storage apparatus 10 which needs the operation mode to be changed (S2019). Thereafter, the processing returns to S2011. Note that processing which is performed by the storage apparatus 10 when the operation mode change instruction is received from the management apparatus 3 is described later.

Figure 21:
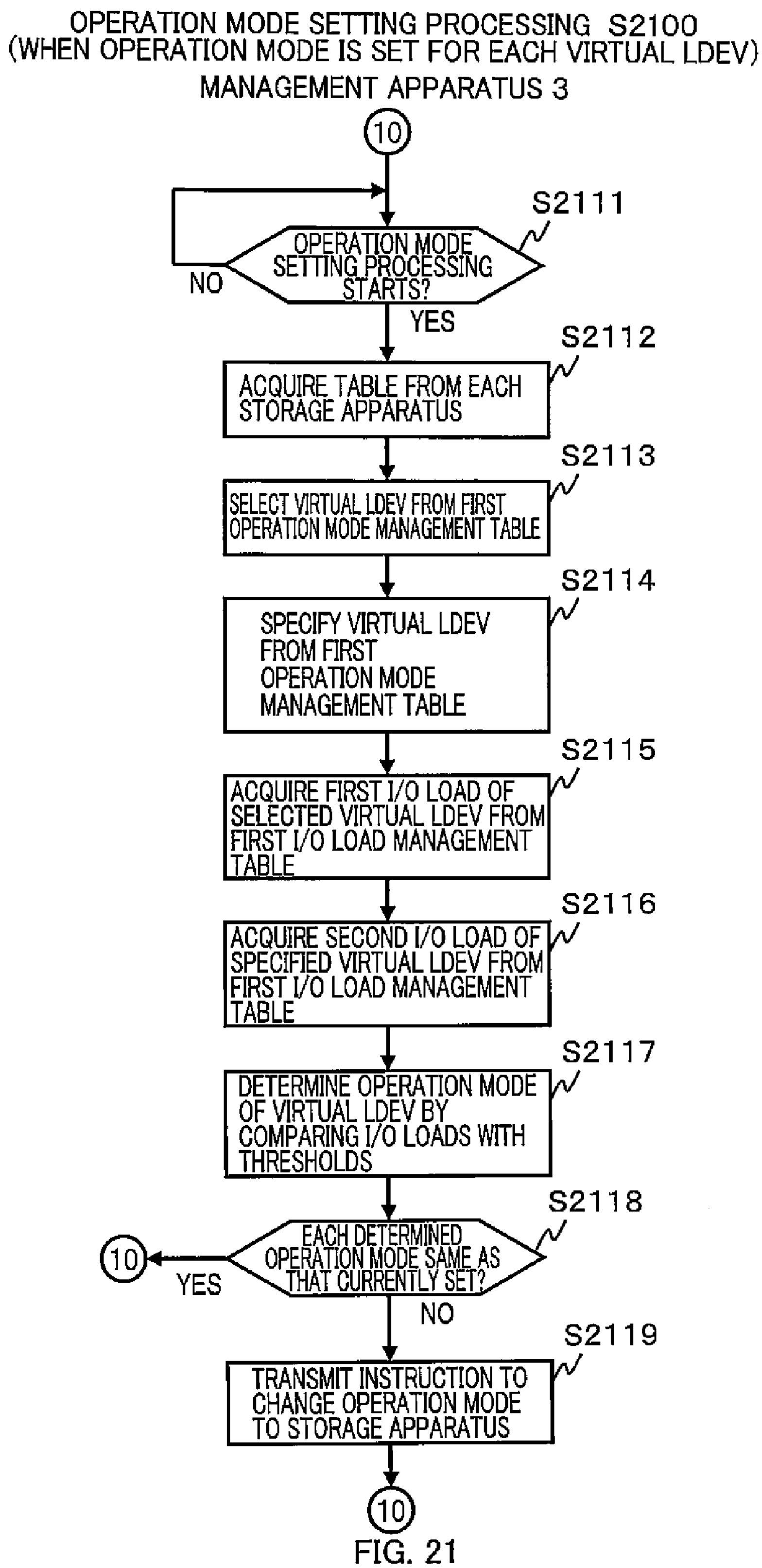
FIG. 21 is a flowchart illustrating operation mode setting processing S2100.

FIG. 21 is a flowchart illustrating processing of changing the operation mode when the first storage apparatus 10 and the second storage apparatus 10 manages the operation mode of the virtual LDEVs in units of virtual LDEVs.

The management apparatus 3 determines an operation mode to be set for each virtual LDEV based on the contents (IO load of each virtual LDEV) of the IO load management table 124 of each of the first storage apparatus 10 and the second storage apparatus 10 and sets the operation mode of each virtual LDEV so that the operation mode of each virtual LDEV becomes the determined operation mode (sets the contents of the operation mode management table 123 of each of the first storage apparatus 10 and the second storage apparatus 10). With this operation, the data received from the host computer 2 is managed according to an appropriate data management method. Thus, the resources of the storage apparatus 10 can be effectively used and response performance to the host computer 2 can be secured In the following description the differences between FIG. 20 will be given.

The management apparatus 3 selects a virtual LDEV from the operation mode management table 123 (hereinafter referred to as the first operation mode management table 123) acquired from the first storage apparatus 10 (S2113).

Subsequently, the management apparatus 3 determines the virtual LDEV having the same virtual LDEV-ID as that of the virtual LDEV selected at S2113 based on the operation load management table 123 (hereinafter referred to as the second IO load management table 123) acquired from the second storage apparatus 10 (S2114).

Next, the management apparatus 3 acquires an IO load (at least one value among access count (total) 613, access count (Read) 614, and access count (Write) 615, and hereinafter referred to as the first IO load) of the virtual LDEV selected at S2113 from the IO load management table 124 (hereinafter referred to as the first IO load management table 124) acquired from the first storage apparatus 10 (S2115).

Further, the third management apparatus 3 acquires an IO load (at least one value among access count (total) 613, access count (Read) 614, and access count (Write) 615, and hereinafter referred to as the second IO load) of the virtual LDEV specified at S2114 from the IO load management table 124 (hereinafter referred to as the second IO load management table 124) acquired from the second storage apparatus 10 (S2016).

Next, the management apparatus 3 determines an operation mode to be set for the virtual LDEVs in each of the first storage apparatus 10 and the second storage apparatus 10 based on the first IO load acquired at S2115 and the second IO load acquired at S2116 (S2117).

For example, when a ratio of the second IO load to the first IO load exceeds a predetermined threshold (the second IO load>>the first IO load), the management apparatus 3 selects the IO request transfer method in view of improving the response performance to the host computer 2 as a whole storage system by concentrating the load on the second storage apparatus 10 side, and determines the operation mode to be set to the virtual LDEV of the first storage apparatus 10 as the "SW mode" and the operation mode to be set to the virtual LDEV of the second storage apparatus 10 as the "NM mode".

Specifically, for example, the management apparatus 3 determines the operation mode to be set to the virtual LDEV of the first storage apparatus 10 as the "SW mode" and the operation mode to be set to the virtual LDEV of the second storage apparatus 10 as the "NM mode" when the second IO load (the access count (total) 613 value in the second IO load management table 124) exceeds an upper limit threshold (the operation mode change upper limit threshold 616 value of the second IO load management table 124) and the first IO load (the access count (total) 613 value in the first IO load management table 124) is smaller than a lower limit threshold (the operation mode change lower limit threshold 617 value in the first IO load management table 124).

Also, for example, when the ratio of the first IO load to the second IO load exceeds a predetermined threshold (the first IO load>>the second IO load), the management apparatus 3 selects the IO request transfer method in view of improving response performance to the host computer 2 as a whole storage system by concentrating loads on the first storage apparatus 10 side, and determines the operation mode to be set to the virtual LDEV of the first storage apparatus 10 to "NM mode" and the operation mode to be set to the virtual LDEV of the second storage apparatus 10 to "SW mode".

Specifically, for example, the management apparatus 3 determines the operation mode to be set in the virtual LDEV of the first storage apparatus 10 to "NM mode" and the operation mode to be set in the virtual LDEV of the second storage apparatus 10 to "SW mode" when the second IO load is smaller than the lower limit threshold (the operation mode change lower limit threshold 617 value in the second IO load management table 124) and the first IO load exceeds the upper limit threshold (the operation mode change upper limit threshold 616 value in the first IO load management table 124).

Also, for example, when both the first IO load and the second IO load are heavy the management apparatus 3 selects the dual management method in view of improving availability of the data received from the host computer 2 and determines the operation mode to be set to the virtual LDEVs of the first storage apparatus 10 and the second storage apparatus 10 to "HA mode".

Specifically, for example, the management apparatus 3 determines the operation mode to be set in the virtual LDEV of the first storage apparatus 10 and the second storage apparatus 10 to “HA mode” when the first IO load (the access count (total) 613 value in the first IO load management table 124) exceeds the first upper limit threshold (the operation mode change upper limit threshold 616 value in the first IO load management table 124) and the second IO load (the access count (total) 613 value in the second IO load management table 124) exceeds the second upper limit threshold (the operation mode change upper limit threshold 616 value in the second IO load management table 124).

Further, both the first IO load and the second IO load may determine whether or not the load due to a read request is heavy. This is because the IO load on the storage apparatus 10 by a read request is lighter compared to a write request, so the effect on the response performance to the host computer 2 is small even when the dual management method is selected.

Specifically, the management apparatus 3 determines the operation mode to be set in the virtual LDEV of the first storage apparatus 10 and the second storage apparatus as the “HA mode” when the first IO load (the access count (total) 613 value in the first IO load management table 124) exceeds the first upper limit threshold (the operation mode change upper limit threshold 616 value of the first IO load management table 124), and the second IO load (the access count (total) 613 value in the second IO load management table 124) exceeds the second upper limit threshold (the operation mode change upper limit threshold 616 value of the second IO load management table 124), and the first IO load for the read request (the access count (Read) 614 value in the first IO load management table 124) exceeds the third upper limit threshold (the operation mode change upper limit threshold (Read) 618 value of the first IO load management table 124), and the second IO load for the read request (the access count (Read) 614 value in the second IO load management table 124) exceeds the fourth upper limit threshold (the operation mode change upper limit threshold (Read) 618 value of the second IO load management table 124).

Subsequently, the management apparatus 3 refers to the first operation mode management table 123 and the second operation mode management table 123, and determines whether the operation mode of each of the virtual LDEV of the first storage apparatus 10 and the second storage apparatus 10 determined at S2117 is the same as the currently-set operation mode (S2118).

By the way, in the above-described operation mode setting processing S2000 or S2100, mainly the management apparatus 3 performs the setting of the operation mode. However, for example, mainly the host computer 2 or the storage apparatus 10 may perform the setting.

Also, when mainly the storage apparatus 10 performs the setting of the operation mode, mainly the storage apparatus 10 having an LDEV to which a “Master” attribute is set may perform the setting of the operation mode. By doing so, the control or setting may be mainly and intensively performed by the storage apparatus 10 having an LDEV to which the “Master” attribute is set. Thus, the maintainability of the storage system can be improved.

As described above, the operation mode is set for each of the first storage apparatus 10 and the second storage apparatus 10 according to the first IO load and the second IO load in the information processing system 2 of the present embodiment, and the management method for the data received from the host computer 2 is properly selected. Thus, the availability of the data received from the host computer 2 can be secured as much as possible and the response performance to the host computer 2 can be also secured, according to the loads of the first storage apparatus 10 and the second storage apparatus 10.

Also, since the data management method is selected for each page as a unit, a data management method can be carefully selected according to an IO load per page. Thus, with the whole storage system as a whole, the data received from the host computer 2 can be properly managed. However, the mode management and the load management may be performed in units of virtual LDEVs as described above.

=Operation Mode Change Processing=

Described is a processing which is performed when the storage apparatus 10 receives an operation mode change instruction transmitted from the management apparatus 3 in the processing of S2019. Note that the processing described below is performed on a page in which an operation mode change is permitted (a page in which “Y” is set in the operation mode change permission 514 of the operation mode management table 123). Note that, the phrase “first page of the virtual LDEV” is to be read as “virtual LDEV of the first storage apparatus” and the “second page of the virtual LDEV” is to be read as “virtual LDEV of the second storage apparatus” when the operation is set in units of virtual LDEVs.

Figure 22:
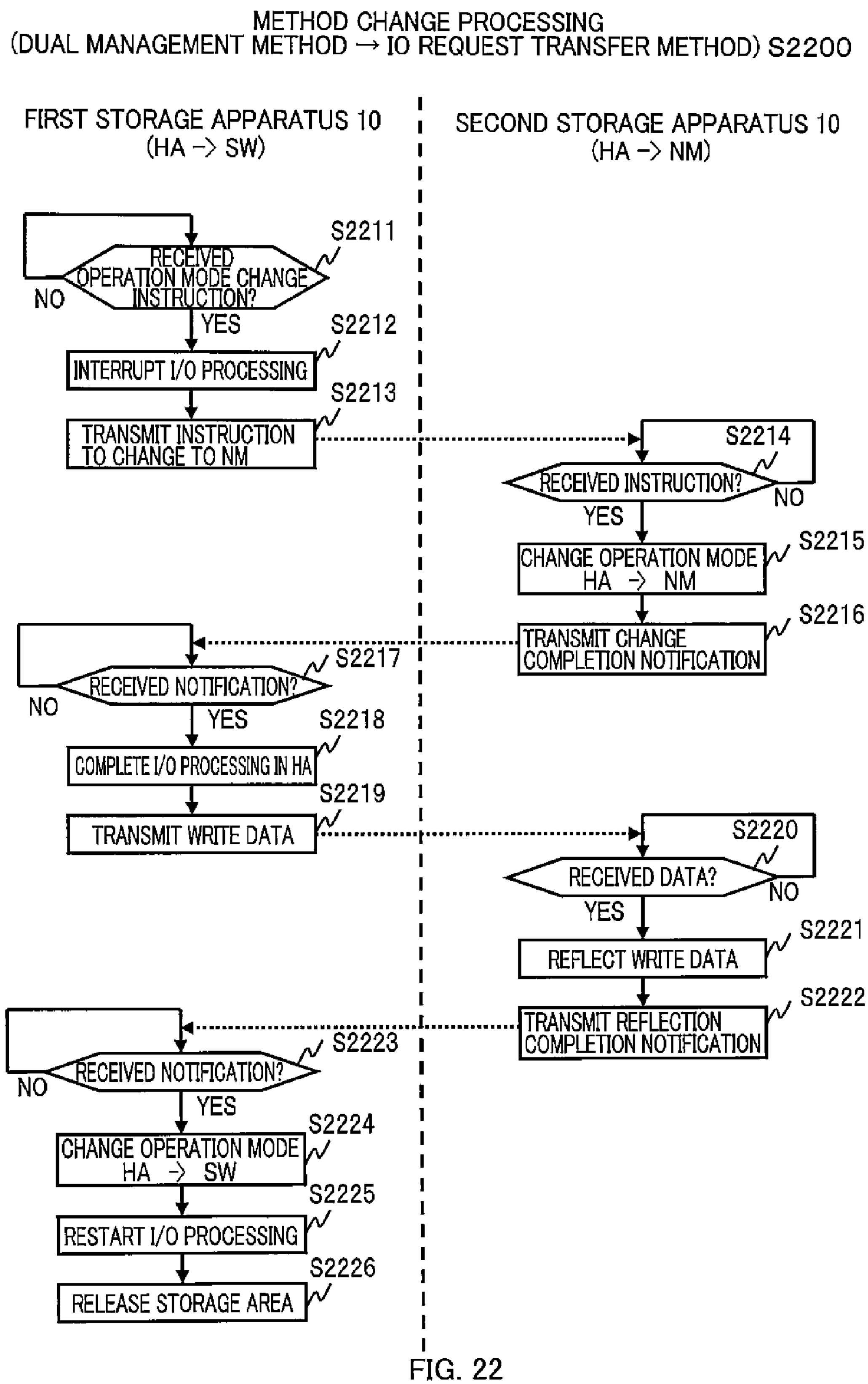
FIG. 22 is a flowchart illustrating method change processing (dual->IO request transfer) S2200.

<When Shifting from the Dual Management Method to the IO Request Transfer Method FIG. 22 is a flowchart illustrating processing (hereinafter referred to as “method change processing (the dual management method->the IO request transfer method)” S2200) which is carried out by each of the first storage apparatus 10 and the second storage apparatus 10 in a case where the operation mode of the first page is set to “SW mode” and the operation mode of the second page is set to “NM mode” (the management of the data received from the host computer 2 is managed by the IO request transfer method) when “HA mode” is set to both the first page of the virtual LDEV of the first storage apparatus 10 and the second page of the virtual LDEV of the second storage apparatus 10 (when data received from the host computer 2 is managed by the dual management method). Hereinafter, the method change processing (the dual management method->the IO request transfer method) S2200 is described together with reference to FIG. 22.

When receiving the operation mode change instruction from the management apparatus 3 (S2211: YES), the first storage apparatus 10 interrupts the IO processing which is currently executed on the first page in response to the IO request received from the host computer 2 (S2212), and transmits an instruction indicating to change the operation mode of the second page to the “NM mode” to the second storage apparatus 10 (S2213).

When receiving the aforementioned instruction (S2214: YES), the second storage apparatus 10 changes the operation mode of the second page to the “NM mode” (S2215), and transmits a notification notifying the first storage apparatus 10 that the change of the operation mode has been completed (S2216). Note that after HA mode is changed to NM mode, the second storage apparatus 10 stops transmitting write requests and write data from the second storage apparatus 10 to the first storage apparatus.

When receiving the notification (S2217: YES), the first storage apparatus 10 completes the IO processing interrupted at the processing of S2212 (S2218), and transmits write data which has not been transmitted to the first storage apparatus 10 (write data which has not been transferred to the second storage apparatus 10 in the processing of S1112 in FIG. 11) to the second storage apparatus 10 (S2219).

When receiving the write data (S2220), the second storage apparatus 10 reflects this on the second page (S2221), and transmits a notification notifying the first storage apparatus 10 that the reflection has been completed (S2222).

When receiving the aforementioned notification (S2223: YES), the first storage apparatus 10 changes the operation mode of the first page to the "SW mode" (S2224).

Then, the first storage apparatus 10 restarts the IO processing (S2225) and releases the storage area of the second page (S2226).

According to the above-described method change processing (the dual management method->the IO request transfer method) S2200, the IO processing in progress when the dual management method is selected is completed before a shift to the IO request transfer method is made (S2218 to S2222). Thus, the shift to the IO request transfer method can be securely and safely made. Also, the shift from the dual management method to the IO request transfer method can be made without affecting the services to the host computer 2.

<When Reversing the Relations Between the "SW Mode" and the "NM Mode" of the IO Request Transfer Method>

Figure 23:
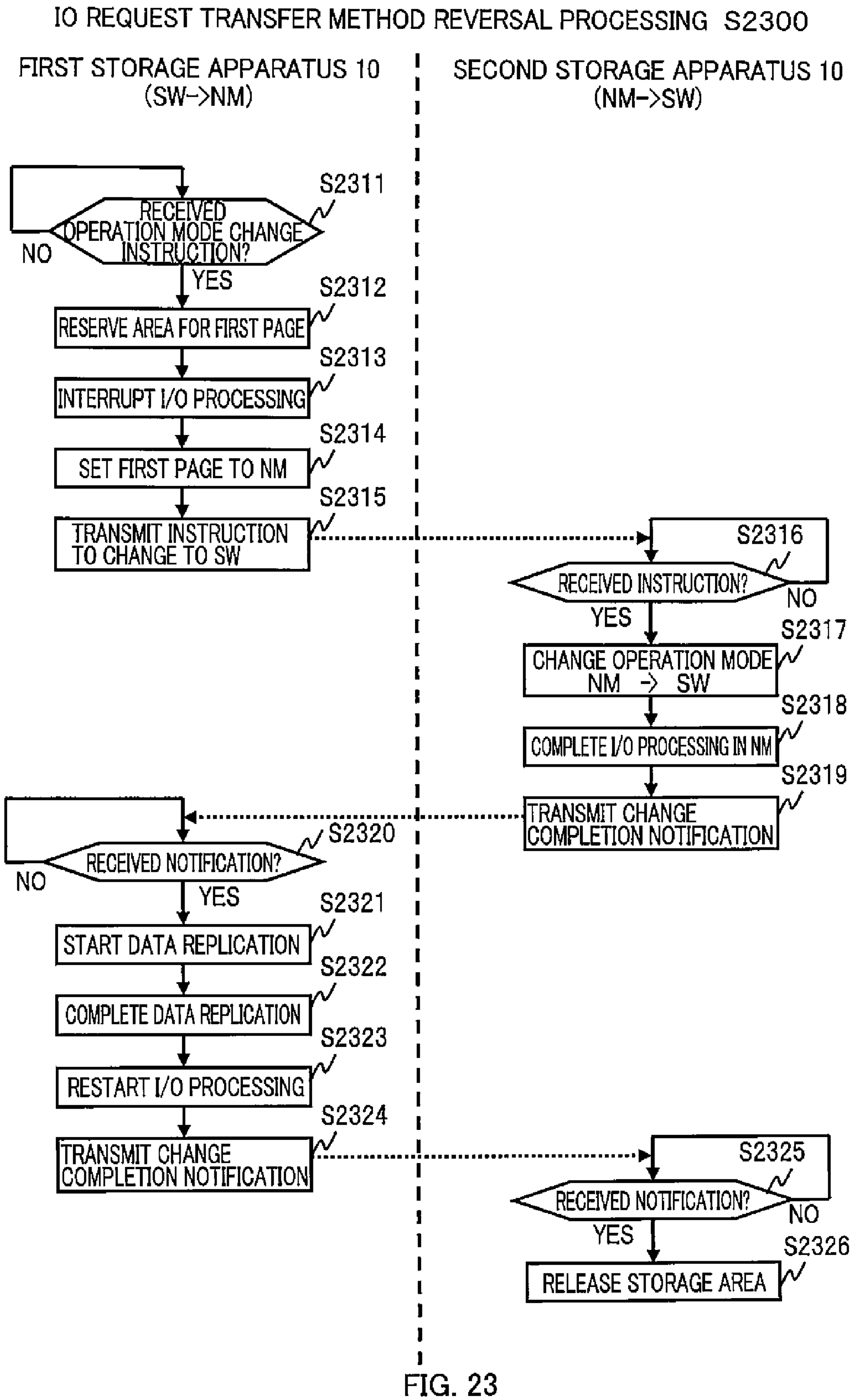
FIG. 23 is a flowchart illustrating IO request transfer method reverse processing S2300.

FIG. 23 is a flowchart illustrating processing (hereinafter referred to as "IO request transfer method reversal processing S2300") which is performed by each of the first storage apparatus 10 and the second storage apparatus 10 in a case where the operation mode of the first page is set to "NM mode" and the operation mode of the second page is set to "SW mode" (the relations between the "SW mode" and the "NM mode" of the IO request transfer method are reversed) when the operation mode of the first page of the virtual LDEV of the first storage apparatus 10 is set to "SW mode" and the operation mode of the second page of the virtual LDEV of the second storage apparatus 10 is set to "NM mode" (when the data received from the host computer 2 is managed by the IO request transfer method). Hereinafter, the IO request transfer method reversal processing S2300 is described together with reference to FIG. 23.

When receiving an operation mode change instruction from the management apparatus 3 (S2311: YES), the first storage apparatus 10 reserves a storage area for the first page (S2312).

Subsequently, the first storage apparatus 10 interrupts the IO processing (S2313), sets the operation mode of the first page to "NM mode" (S2314), and transmits an instruction to change the operation mode of the second page to the "SW mode" to the second storage apparatus 10 (S2315).

When receiving the aforementioned instruction (S2316: YES), the second storage apparatus 10 changes the operation mode of the second page to the "SW mode" (S2317), completes the IO processing relating to the IO request for the second page (S2318), and transmits a notification notifying the second storage apparatus 10 that the change of the operation mode has been completed (S2319).

When receiving the aforementioned notification (S2320: YES), the first storage apparatus 10 starts replicating data of the second page to the first page (S2321). When the replication is completed (S2323), the first storage apparatus 10 restarts the IO processing (S2323) and transmits a notification notifying the second storage apparatus 10 that the data replication has been completed (S2324).

When receiving the aforementioned notification (S2325: YES), the second storage apparatus 10 releases the storage area of the second page (S2326).

According to the above-described 10 request transfer method reversal processing S2300, the IO processing in progress before reversal is completed and then the relations between the "SW mode" and the "NM mode" are reversed (S2318). Thus, the operation modes can be securely and safely reversed without affecting the services to the host computer 2.

<When Shifting from the IO Request Transfer Method to the Dual Management Method>

Figure 24:
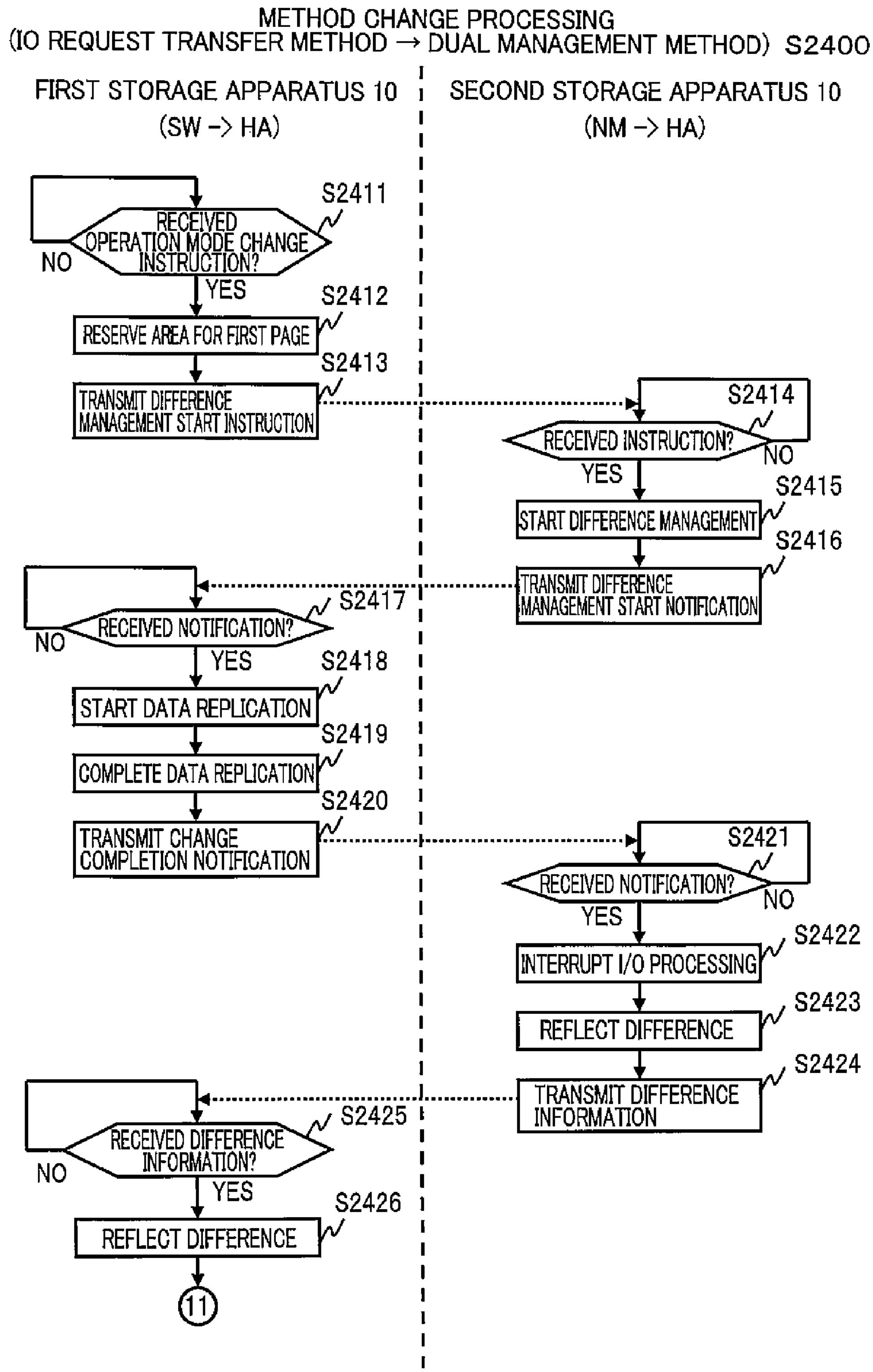
FIG. 24 is a flowchart illustrating method change processing (IO request transfer method->dual management method) S2400.
Figure 25:
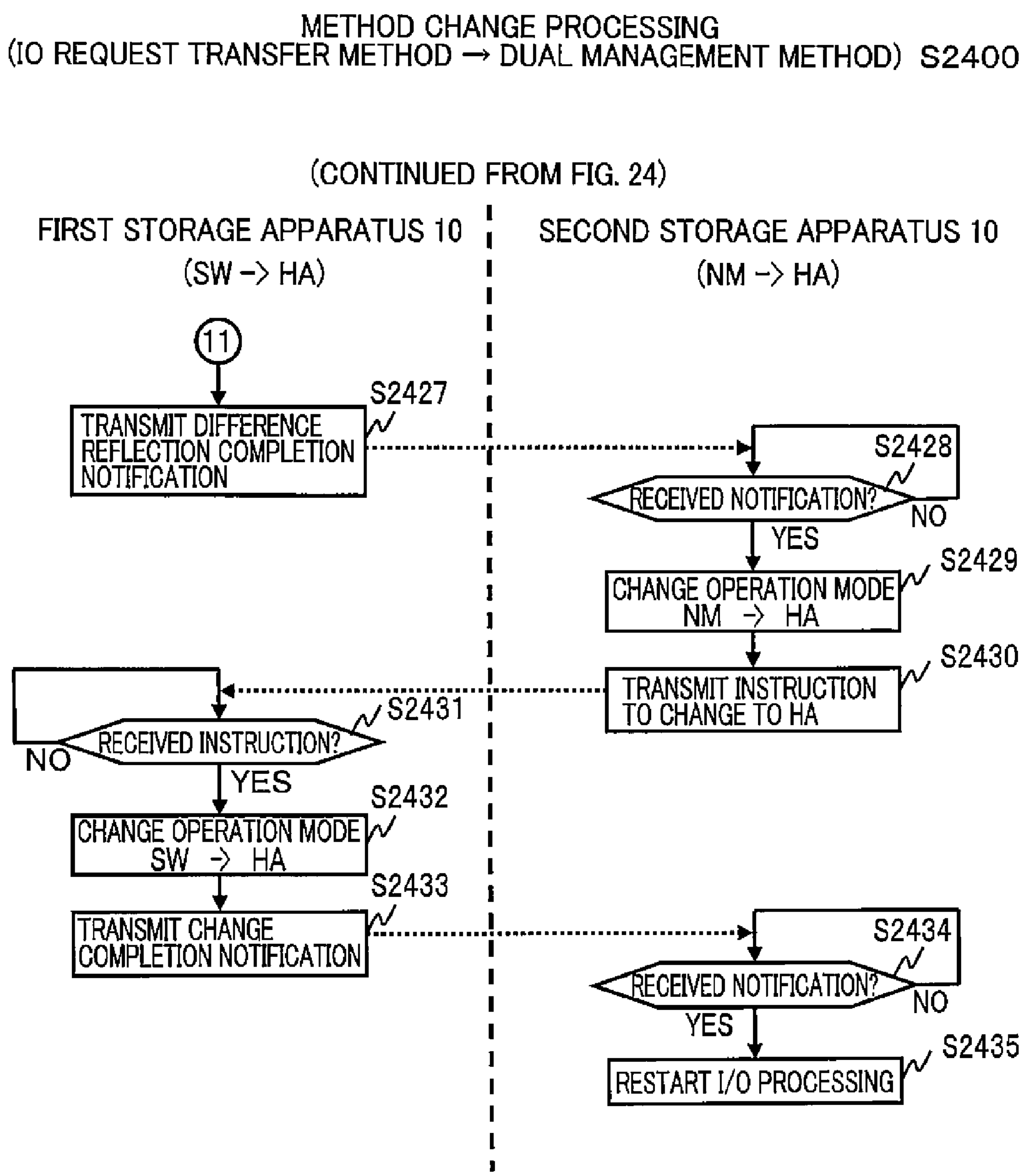
FIG. 25 is a flowchart illustrating method change processing (IO request transfer method->dual management method) S2400 (continued from FIG. 24).

FIG. 24 and FIG. 25 are flowcharts illustrating processing (hereinafter referred to as "method change processing (the IO request transfer method->the dual management method) S2400") which is performed by each of the first storage apparatus 10 and the second storage apparatus 10 in a case where the "HA mode" is set for both the first page and the second page (management of data received from the host computer 2 is changed to the dual management method) when the operation mode of the first page of the first storage apparatus 10 is set to "SW mode" and the operation mode of the second page of the second storage apparatus 10 is set to "NM mode" (when data received from the host computer 2 is managed by the IO request transfer method). Hereinafter, method change processing (the IO request transfer method->the dual management method) S2400 is described with reference to FIGS. 24 and 25.

When receiving an operation mode change instruction from the management apparatus 3 (S2411: YES), the first storage apparatus 10 firstly reserves a storage area for the first page (S2412).

Subsequently, the first storage apparatus 10 transmits an instruction to the second storage apparatus 10 to start management (hereinafter referred to as differential management) of information (information relating to update of the second page (such as write request, write data), and hereinafter referred to as differential information) relating to the IO request which is received by the second storage apparatus 10 from the host computer 2 during the replication when the data is later replicated from the second page to the first page (S2413).

When receiving the aforementioned instruction (S2414: YES), the second storage apparatus 10 starts differential management and transmits a notification notifying the first storage apparatus 10 that the differential management has been started (S2415).

When receiving the aforementioned notification (S2417: YES), the first storage apparatus 10 starts replication of data from the second page to the first page (S2418). Then, when the replication of data has been completed (S2419), the second storage apparatus 10 transmits the completion notification to the second storage apparatus 10 (S2420).

When receiving the aforementioned notification (S2421: YES), the second storage apparatus 10 interrupts the IO processing for the second page (S2422), and starts the management at S2415 and thereafter updates the second page to the latest state based on the differential information acquired so far (S2423). Also, the second storage apparatus 10 transmits the differential information to the first storage apparatus 10 (S2424).

When receiving the aforementioned differential information (S2425: YES) the first storage apparatus 10 updates the first page to the latest state based on the received differential information (S2426), and transmits the completion notification to the second storage apparatus 10 (FIG. 25: S2427).

When receiving the aforementioned notification (S2428: YES), the second storage apparatus 10 changes the operation mode of the second page to the "HA mode" (S2429), and transmits a notification notifying the first storage apparatus 10 that the change of the operation mode is completed (S2430).

When receiving the aforementioned instruction (S2431: YES), the first storage apparatus 10 sets the operation mode of the first page to "HA mode" (S2432), and transmits a notification notifying the second storage apparatus 10 that the change of the operation mode is completed (S2433).

When receiving the aforementioned notification (S2434: YES), the second storage apparatus 10 restarts the IO processing (S2435).

According to the above-described method change processing (the IO request transfer method->the dual management method) S2400, when data is replicated from the second page to the first page, differential information relating to the update of the second page is managed and the differential information is reflected on the first page and the second page after the aforementioned replication is completed (S2415 to 2426). Thus, the shift to the dual management method can be made after the contents of the first page and the second page are surely updated to the, latest state. Accordingly, the shift from the IO request transfer method to the dual management method can be made without affecting the services to the host computer 2.

As above, the embodiments of the present invention have been described. However, the embodiments are for facilitate understanding of the present invention, and are not to provide limited interpretation of the present invention. The present invention may be modified or improved without departing from the gist thereof and equivalents of the present invention are also included in the present invention.

For example, in the above description, the data management method and the operation mode are set page units. However, the operation mode may be set in units of storage apparatuses 10 or LDEVs. Also, the operation mode may be determined based on the load on the entire storage apparatus 10 or the load on all LDEV s.

The invention claimed is:

1. A storage system coupled to a host computer, comprising:

a first storage apparatus including a first logical volume associated with a virtual volume, and configured to provide the first logical volume to the host computer as the virtual volume; and a second storage apparatus being coupled to the first storage apparatus, having a second logical volume associated with the virtual volume, and configured to provide the second logical volume to the host computer as the virtual volume, wherein the first storage apparatus, when receiving a first write request for the virtual volume, is capable of performing a processing for the first write request by one of a first write processing method and a second write processing method, wherein the first storage apparatus is configured to process the first write processing method by which a processing of storing write data relating to the first write request in the first logical volume is executed as well as the first write request is transferred to the second storage apparatus to store the write data in the second logical volume in the second storage apparatus, wherein the first storage apparatus is configured to process the second write processing method by which the first write request is transferred to the second storage apparatus to store the write data in the second logical volume in the second storage apparatus without executing the processing of storing the write data in the first logical volume, and wherein the first storage apparatus is configured to acquire a first IO load for a predetermined area of the virtual volume in the first storage apparatus, and a second IO load for the predetermined area of the virtual volume in the second storage apparatus;, select either the first write processing method or the second write processing method by comparing the first IO load and the second IO load with a threshold; and perform a processing for the first write request using the selected processing method.

2. The storage system according to claim 1, wherein the first storage apparatus is further capable of performing a processing for the first write request by a third write processing method by which a processing of storing the write data in the first logical volume is executed without transferring the write request to the second storage apparatus; and the first storage apparatus is configured to perform a processing for the first write request by a method selected from among the first write processing method, the second write processing method, and the third write processing method according to a first IO load for the predetermined area of the virtual volume in the first storage apparatus, and a second IO load for the predetermined area of the virtual volume in the second storage apparatus.

3. The storage system according to claim 2, wherein the first storage apparatus is configured to perform a processing for the first write request by the first write processing method when the first IO load is greater than a first upper limit threshold and the second IO load is greater than a second upper limit threshold.

4. The storage system according to claim 2, wherein the first storage apparatus is configured to perform a processing for the first write request by the first write processing method when the first IO load is greater than a first upper limit threshold and the second IO load is greater than a second upper limit threshold, and further a first read load is greater than a first read upper limit threshold and a second read load is greater than a second read upper limit threshold.

5. The storage system according to claim 2, wherein the first storage apparatus is configured to perform a processing for the first write request by the second write processing method when the first IO load is less than a first upper limit threshold and the second IO load is greater than a second upper limit threshold.

6. The storage system according to claim 2, wherein the first storage apparatus is configured to perform a processing for the first write request by the third write processing method when the first IO load is greater than a first upper limit threshold and the second IO load is less than a second lower limit threshold.

7. The storage system according to claim 2, wherein the first IO load is a number of IO requests per unit time for the virtual volume that the first storage apparatus receives;, and the second IO load is a number of IO requests per unit time for the virtual volume that the second storage apparatus receives.

8. The storage system according to claim 2, wherein the first storage apparatus is configured to manage the first IO load in units of pages, being a unit storage area, included in the virtual volume;

the second storage apparatus is configured to manage the second IO load in units of the pages, being a unit storage area, included in the virtual volume; and the first storage apparatus is configured to perform a processing for the first write request by a method selected from among the first write processing method, the second write processing method, and the third write processing method according to the first IO load and the second IO load in units of pages included in the virtual volume.

9. The storage system according to claim 2, wherein the second storage apparatus is configured to perform a processing for a second write request as received for the virtual volume by the first write processing method when the first storage apparatus performs a processing by the first write processing method for the first write request to the virtual volume received by the first storage apparatus;

the second storage apparatus is configured to perform a processing for a second write request as received for the virtual volume by the third write processing method when the first storage apparatus performs a processing by the second write processing method for the first write request to the virtual volume received by the first storage apparatus; and the second storage apparatus is configured to perform a processing for a second write request as received for the virtual volume by the second write processing method when the first storage apparatus performs a processing by the third write processing method for the first write request to the virtual volume received by the first storage apparatus.

10. A method of controlling a storage system including a first storage apparatus including a first logical volume associated with a virtual volume, and providing the virtual volume and a second storage apparatus being coupled to the first storage apparatus, having a second logical volume associated with the virtual volume, and providing the virtual volume, the method comprising:

the first storage apparatus, when receiving a first write request for the virtual volume, performs a processing for the first write request by one of a first write processing method by which a processing of storing write data relating to the first write request in the first logical volume is executed as well as the first write request is transferred to the second storage apparatus to store the write data in the second logical volume in the second storage apparatus, and a second write processing method by which the first write request is transferred to the second storage apparatus to store the write data in the second logical volume in the second storage apparatus without executing the processing of storing the write data in the first logical volume, wherein the first storage apparatus acquires a first IO load for a predetermined area of the virtual volume in the first storage apparatus, and a second IO load for the predetermined area of the virtual volume in the second storage apparatus;

selects either the first write processing method or the second write processing method by comparing the first IO load and the second IO load with a threshold; and performs a processing for the first write request using the selected processing method.

11. The method of controlling a storage system according to claim 10, wherein the first storage apparatus further performs a processing for the first write request by a third write processing method by which a processing of storing the write data in the first logical volume is executed without transferring the write request to the second storage apparatus; and the first storage apparatus performs a processing for the first write request by a method selected from among the first write processing method, the second write processing method, and the third write processing method according to a first IO load for the predetermined area of the virtual volume in the first storage apparatus, and a second IO load for the predetermined area of the virtual volume in the second storage apparatus.

12. The method of controlling a storage system according to claim 11, wherein the first storage apparatus performs a processing for the first write request by the first write processing method when the first IO load is greater than a first upper limit threshold and the second IO load is greater than a second upper limit threshold;

the first storage apparatus performs a processing for the first write request by the second write processing method when the first IO load is less than the first upper limit threshold and the second IO load is greater than the second upper limit threshold; and the first storage apparatus performs a processing for the first write request by the third write processing method when the first IO load is greater than the first upper limit threshold and the second IO load is less than the second lower limit threshold.

13. The method of controlling a storage system according to claim 11, wherein the first IO load is a number of IO requests per unit time for the virtual volume that the first storage apparatus receives; and the second IO load is a number of IO requests per unit time for the virtual volume that the second storage apparatus receives.

14. The method of controlling a storage system according to claim 11, wherein the first storage apparatus manages the first IO load in units of pages, being a unit storage area, included in the virtual volume;

the second storage apparatus manages the second IO load in units of the pages, being a unit storage area, included in the virtual volume; and the first storage apparatus performs a processing for the first write request by a method selected from among the first write processing method, the second write processing method, and the third write processing method according to the first IO load and the second IO load in units of pages included in the virtual volume.

15. The method of controlling a storage system according to claim 11, wherein the second storage apparatus performs a processing for a second write request as received for the virtual volume by the first write processing method when the first storage apparatus performs a processing by the first write processing method for the first write request to the virtual volume received by the first storage apparatus;

the second storage apparatus performs a processing for a second write request as received for the virtual volume by the third write processing method when the first storage apparatus performs a processing by the second write processing method for the first write request to the virtual volume received by the first storage apparatus; and the second storage apparatus performs a processing for a second write request as received for the virtual volume by the second write processing method when the first storage apparatus performs a processing by the third write processing method for the first write request to the virtual volume received by the first storage apparatus.

16. The method of controlling a storage system according to claim 10, wherein the first storage apparatus, when receiving an operation mode change instruction, reserves a storage area for a first page, and transmits a difference management start instruction;

the second storage apparatus, when receiving the difference management start instruction, starts management of differential information of a second page relating to an IO request received by the second storage apparatus, and transmits a difference management start notification;

the first storage apparatus, when receiving the difference management start notification, starts replication of data from the second page to the first page, and, when replication has been completed, transmits a completion notification;

the second storage apparatus, when receiving the completion notification, interrupts IO processing for the second page and updates the second page to a latest state based on differential information acquired so far, and transmits the differential information;

the first storage apparatus, when receiving the differential information, updates the first page to the latest state based on the received differential information, and transmits a difference reflection completion notification;

the second storage apparatus, when receiving the difference reflection completion notification, changes operation mode of the second page to a first mode and transmits a change instruction;

the first apparatus, when receiving the change instruction, sets the operation mode of the first page to the first mode, and transmits a change completion notification; and the second storage apparatus, when receiving the change completion notification, restarts IO processing.

* * * * *